United States Patent
Furuta

(10) Patent No.: US 11,919,353 B2
(45) Date of Patent: Mar. 5, 2024

(54) DAMPING CONTROL DEVICE AND DAMPING CONTROL METHOD FOR VEHICLE

(71) Applicant: Toyota Jidosha Kabushiki Kaisha, Toyota (JP)

(72) Inventor: Hiroki Furuta, Numazu (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 440 days.

(21) Appl. No.: 17/325,569

(22) Filed: May 20, 2021

(65) Prior Publication Data

US 2021/0402840 A1 Dec. 30, 2021

(30) Foreign Application Priority Data

Jun. 24, 2020 (JP) ................. 2020-108819

(51) Int. Cl.
*B60G 17/0165* (2006.01)
*B60G 17/018* (2006.01)

(52) U.S. Cl.
CPC ....... *B60G 17/0165* (2013.01); *B60G 17/018* (2013.01); *B60G 2204/62* (2013.01); *B60G 2400/821* (2013.01); *B60G 2600/182* (2013.01); *B60G 2800/162* (2013.01)

(58) Field of Classification Search
CPC .............. B60G 17/0165; B60G 17/018; B60G 2204/62; B60G 2400/821; B60G 2600/182; B60G 2800/162; B60G 17/01908; B60G 17/01933; B60G 17/0157; B60G 2400/252; B60G 2400/824; B60G 2400/91; B60G 17/019

USPC .......................................................... 701/37
See application file for complete search history.

(56) References Cited

U.S. PATENT DOCUMENTS

| 5,124,917 A | 6/1992 | Kanamori | |
|---|---|---|---|
| 2008/0292871 A1* | 11/2008 | Yeh | G02B 1/11 |
| | | | 428/323 |
| 2010/0324780 A1* | 12/2010 | Koumura | B60G 21/0555 |
| | | | 701/38 |
| 2018/0154723 A1* | 6/2018 | Anderson | H02K 11/33 |

(Continued)

FOREIGN PATENT DOCUMENTS

| DE | 4015221 A1 | 11/1990 |
|---|---|---|
| DE | 102016216008 A1 | 3/2018 |

(Continued)

*Primary Examiner* — Scott A Reinbold
(74) *Attorney, Agent, or Firm* — Dinsmore & Shohl LLP

(57) ABSTRACT

A control unit configured to control a control force generating device configured to generate a control force for damping a sprung portion of a vehicle controls the control force generating device based on a target control force Fcit for damping the sprung portion when a wheel passes through a predicted wheel passing position. The control unit acquires an unsprung displacement $z_1 i$ at the predicted wheel passing position, and calculates the target control force as a value proportional to an unsprung displacement $z_1 ai$ that is the unsprung displacement $z_1 i$ having a phase that has been advanced to advance a phase of a transfer function from the unsprung displacement $z_1 i$ to the target control force by a phase advance amount larger than 0 degrees and smaller than 180 degrees.

13 Claims, 12 Drawing Sheets

(56) References Cited

U.S. PATENT DOCUMENTS

| | | | | |
|---|---|---|---|---|
| 2019/0168563 A1* | 6/2019 | Bärecke | ................ | B60G 17/08 |
| 2020/0105774 A1* | 4/2020 | Penumatcha | ......... | G11C 11/221 |
| 2022/0105770 A1* | 4/2022 | Furuta | ................ | B60G 17/0165 |
| 2022/0105771 A1* | 4/2022 | Furuta | ................ | B60G 17/0165 |

FOREIGN PATENT DOCUMENTS

| JP | H04339010 A | | 11/1992 |
|---|---|---|---|
| JP | H05319066 A | | 12/1993 |
| JP | 07215032 A | * | 8/1995 |
| JP | 07215032 A | | 8/1995 |
| JP | 2009-096366 A | | 5/2009 |
| JP | 2016-107778 A | | 6/2016 |
| WO | 2018-154723 A1 | | 8/2018 |

\* cited by examiner

DAMPING CONTROL DEVICE AND DAMPING CONTROL METHOD FOR VEHICLE

CROSS-REFERENCE TO RELATED APPLICATION

This application claims priority to Japanese Patent Application No. 2020-108819 filed on Jun. 24, 2020, incorporated herein by reference in its entirety.

BACKGROUND

1. Technical Field

The present disclosure relates to a damping control device and a damping control method for a vehicle such as an automobile.

2. Description of Related Art

Control on traveling conditions of a vehicle includes control for damping a sprung portion. In this control, a vertical control force to be generated between a wheel and a vehicle body is controlled to damp the sprung portion. As the damping control for the sprung portion of the vehicle, preview damping control is known as described in, for example, Japanese Unexamined Patent Application Publication No. 5-319066 (JP 5-319066 A). In the preview damping control, sprung portions at a front wheel position and a rear wheel position are damped by using vertical road surface displacements ahead of the vehicle that are acquired by a preview sensor. According to the preview damping control, the sprung portion can effectively be damped without a delay as compared to damping control to be performed based on a result of detection of a vertical motion condition amount of the vehicle such as a vertical acceleration of the sprung portion.

As the damping control for the sprung portion of the vehicle, there is also known preview damping control described in, for example, U.S. Patent Application Publication No. 2018/154723 (US 2018/154723 A). This preview damping control is performed based on preview reference data containing positional information of the vehicle and road surface information (road surface information acquired in advance). The preview reference data is stored in a server communicable with the vehicle by wireless. The road surface information contained in the preview reference data is a value indicating a vertical displacement of a road surface (road surface displacement), and is generated based on sensing data acquired by a preview sensor such as a camera sensor, a Light Detection and Ranging (LIDAR) sensor, a radar, or a plane or three-dimensional scanning sensor.

To improve the accuracy of the road surface information contained in the preview reference data, a vertical unsprung displacement may be acquired based on a vertical motion condition amount of the vehicle that is detected while the vehicle is traveling, and a combination of the unsprung displacement and a position where the motion condition amount is detected may be set as the preview reference data. According to the damping control using the preview reference data that is based on the motion condition amount, the sprung portion can be damped with higher accuracy than that of the damping control using the preview reference data that is based on the sensing of the preview sensor.

To effectively damp the sprung portion, a target damping control force for damping the sprung portion may be calculated as the sum of a control component proportional to a time derivative of an unsprung displacement related value such as a road surface displacement or an unsprung displacement, and a control component proportional to the unsprung displacement related value.

SUMMARY

To simply calculate the target damping control force for damping the sprung portion, the control component proportional to the time derivative of the unsprung displacement related value may be omitted, and only the control component proportional to the unsprung displacement related value may be set as the target damping control force.

When the target damping control force is calculated simply as a value proportional to the unsprung displacement related value, however, a vibration component proportional to a time derivative of a road surface displacement related value cannot be damped. When the target damping control force is calculated conversely as a value proportional to the time derivative of the road surface displacement related value, a vibration component proportional to the road surface displacement related value cannot be damped effectively. Further, the target damping control force increases in a high-frequency range, thereby causing problems such as an increase in energy consumption, a decrease in the durability of an actuator, and an increase in a heat generation amount.

For example, in a case A illustrated in FIG. 13 where the target damping control force is a damping force proportional to the road surface displacement related value, the damping force in a frequency range higher than a medium frequency (for example, 2 to 3 Hz) is smaller than a damping force in a case B where the target damping control force is a damping force proportional to the time derivative of the road surface displacement related value and a damping force in a case C where the target damping control force is the sum of the damping force proportional to the road surface displacement related value and the damping force proportional to the time derivative of the road surface displacement related value.

The present disclosure provides a damping control device and a damping control method for a vehicle, in which a target damping control force can be calculated simply and a sprung portion can be damped more effectively than a case where the target damping control force is calculated simply as a value proportional to an unsprung displacement related value.

A first aspect of the present disclosure relates to a damping control device for a vehicle, including a control force generating device, a control unit, and a road surface displacement related information acquiring device. The control force generating device is configured to generate a vertical control force for damping a sprung portion of the vehicle between at least one wheel and a portion of a vehicle body that corresponds to a position of the wheel. The control unit is configured to control the control force generating device. The road surface displacement related information acquiring device is configured to acquire road surface displacement related information related to a vertical displacement of a road surface ahead of the wheel. The control unit is configured to determine a predicted wheel passing position where the wheel is predicted to pass, calculate a target control force for reducing vibration of the sprung portion when the wheel passes through the predicted wheel passing position as a value proportional to a road surface displacement related value that is based on the road surface displacement related information, and control the control force generating device such that the control force generated by the control force generating device becomes the target control force when the wheel passes through the predicted wheel passing position.

The control unit is configured to calculate the target control force by using the road surface displacement related value having a phase that has been advanced to advance a phase of a transfer function from the road surface displacement related value based on the road surface displacement related information to the target control force by a phase advance amount larger than 0 degrees.

According to the configuration described above, the control force generating device is controlled by the target control force calculated by using the road surface displacement related value having the phase that has been advanced to advance the phase of the transfer function from the road surface displacement related value based on the road surface displacement related information to the target control force by the phase advance amount larger than 0 degrees. The target control force calculated as the value proportional to the road surface displacement related value having the advanced phase is closer to the target control force calculated as the sum of the control component proportional to the time derivative of the unsprung displacement related value and the control component proportional to the unsprung displacement related value. Thus, the damping performance for the sprung portion can be improved particularly at a frequency equal to or higher than the medium frequency as compared to a case where the phase of the road surface displacement related value is not advanced. Further, it is possible to reduce the possibility of the problems such as an increase in energy consumption, a decrease in the durability of the actuator, and an increase in the heat generation amount due to the increase in the damping control force in the high-frequency range.

For example, a case D in FIG. 13 is a case where the target control force is calculated as the value proportional to the unsprung displacement related value having the advanced phase. According to the case D, the damping performance for the sprung portion can be improved at a frequency equal to or higher than the medium frequency as compared to the case A where the target control force is calculated as the value proportional to the unsprung displacement related value whose phase is not advanced. According to the case D, the damping performance for the sprung portion can be improved at a frequency equal to or lower than the medium frequency as compared to the case B where the target control force is calculated as the value proportional to the time derivative of the unsprung displacement related value.

The control unit may be configured to calculate the target control force by using the road surface displacement related value having the advanced phase to set the phase advance amount to a value larger than 0 degrees and smaller than 180 degrees for a predetermined frequency.

According to the aspect described above, the phase advance amount for the predetermined frequency can be controlled at the value larger than 0 degrees and smaller than 180 degrees.

The phase advance amount may be a value larger than 0 degrees and smaller than 90 degrees.

According to the aspect described above, the phase advance amount can be controlled at the value larger than 0 degrees and smaller than 90 degrees.

The phase advance amount may be a value equal to or larger than 40 degrees and equal to or smaller than 50 degrees.

According to the aspect described above, the phase advance amount can be controlled at the value equal to or larger than 40 degrees and equal to or smaller than 50 degrees.

The control unit may be configured to acquire the road surface displacement related values at the predicted wheel passing position and in a frequency determination range ahead of the predicted wheel passing position based on the road surface displacement related information, and increase the phase advance amount as a major frequency of the road surface displacement related values in the frequency determination range increases.

According to the aspect described above, the phase advance amount can be reduced when the major frequency of the road surface displacement related values is low, and the phase advance amount can be increased when the major frequency of the road surface displacement related values is high. Thus, in comparison with the case where the phase advance amount is constant, the damping performance for the sprung portion at a frequency equal to or lower than the medium frequency can be made higher than the damping performance in the case B where the target control force is calculated as the value proportional to the time derivative of the unsprung displacement related value, and can be made closer to the damping performance in the case A where the target control force is calculated as the value proportional to the unsprung displacement related value. Further, in comparison with the case where the phase advance amount is constant, the damping performance for the sprung portion at a frequency equal to or higher than the medium frequency can be made higher than the damping performance in the case A, and can be made closer to the damping performance in the case B and in the case C where the target damping control force is the sum of the damping force proportional to the road surface displacement related value and the damping force proportional to the time derivative of the road surface displacement related value.

The control unit may be configured to set the phase advance amount to a value equal to or larger than 40 degrees and equal to or smaller than 50 degrees when the major frequency of the road surface displacement related values in the frequency determination range is in a reference frequency range preset between a sprung resonance frequency and an unsprung resonance frequency of the vehicle.

According to the aspect described above, the phase advance amount can be set to the value equal to or larger than 40 degrees and equal to or smaller than 50 degrees when the major frequency of the road surface displacement related values is in the preset reference frequency range, in other words, the medium frequency range. Thus, the phase advance amount can be prevented from being set extremely large or extremely small in the situation in which the major frequency of the road surface displacement related values is in the medium frequency range.

The control unit may be configured to set the phase advance amount to a value larger than 0 degrees and smaller than 45 degrees when the major frequency of the road surface displacement related values in the frequency determination range is lower than a lower limit frequency of a reference frequency range preset between a sprung resonance frequency and an unsprung resonance frequency of the vehicle.

According to the aspect described above, the phase advance amount can be set to the value larger than 0 degrees and smaller than 45 degrees when the major frequency of the road surface displacement related values is lower than the lower limit frequency of the preset reference frequency range. Thus, the possibility that the phase advance amount is set extremely large can be reduced as compared to a case where the phase advance amount is set to, for example, a value larger than 45 degrees and smaller than 90 degrees in the situation in which the major frequency of the road surface displacement related values is low.

The control unit may be configured to set the phase advance amount to a value larger than 45 degrees and smaller than 90 degrees when the major frequency of the road surface displacement related values in the frequency determination range is higher than an upper limit frequency of a reference frequency range preset between a sprung resonance frequency and an unsprung resonance frequency of the vehicle.

According to the aspect described above, the phase advance amount can be set to the value larger than 45 degrees and smaller than 90 degrees when the major frequency of the road surface displacement related values is higher than the upper limit frequency of the preset reference frequency range. Thus, the possibility that the phase advance amount is set extremely small can be reduced as compared to a case where the phase advance amount is set to, for example, a value larger than 0 degrees and smaller than 45 degrees in the situation in which the major frequency of the road surface displacement related values is high.

The control unit may be configured to acquire the road surface displacement related values at the predicted wheel passing position and in a frequency determination range ahead of the predicted wheel passing position based on the road surface displacement related information, classify the road surface displacement related values in the frequency determination range into a plurality of frequency bands, and determine the phase advance amount based on magnitudes of the road surface displacement related values in the frequency bands.

According to the aspect described above, the road surface displacement related values in the frequency determination range are classified into the plurality of frequency bands, and the phase advance amount can variably be set depending on the magnitudes of the road surface displacement related values in the frequency bands. Thus, the sprung portion can effectively be damped also in the situation in which the frequency of the road surface displacement related values fluctuates, as compared to the case where the phase advance amount is constant.

A second aspect of the present disclosure relates to a damping control method for a vehicle for damping a sprung portion of the vehicle by controlling a control force generating device configured to generate a vertical control force for damping the sprung portion between at least one wheel and a portion of a vehicle body that corresponds to a position of the wheel. The damping control method for the vehicle includes determining a predicted wheel passing position where the wheel is predicted to pass, acquiring road surface displacement related information related to a vertical displacement of a road surface ahead of the wheel, calculating a target control force for reducing vibration of the sprung portion when the wheel passes through the predicted wheel passing position as a value proportional to a road surface displacement related value having a phase that has been advanced to advance a phase of a transfer function from the road surface displacement related value based on the road surface displacement related information to the target control force by a phase advance amount larger than 0 degrees, and controlling the control force generating device such that the control force generated by the control force generating device becomes the target control force when the wheel passes through the predicted wheel passing position.

According to the control method described above, the target control force is calculated as the value proportional to the road surface displacement related value having the advanced phase. Therefore, the target control force is closer to the target control force calculated as the sum of the control component proportional to the time derivative of the unsprung displacement related value and the control component proportional to the unsprung displacement related value. Thus, the damping performance for the sprung portion can be improved particularly at a frequency equal to or higher than the medium frequency as compared to a case where the phase of the road surface displacement related value for use in the calculation of the target control force is not advanced. Further, it is possible to reduce the possibility of the problems such as an increase in energy consumption, a decrease in the durability of the actuator, and an increase in the heat generation amount due to the increase in the damping control force in the high-frequency range.

Other objects, other features, and accompanying advantages of the present disclosure will easily be understood from description of embodiments of the present disclosure with reference to the drawings.

The "road surface displacement related information" mentioned herein may be at least one of an unsprung displacement that is a vertical displacement of an unsprung portion of a vehicle, an unsprung speed that is a time derivative of the unsprung displacement, a road surface displacement that is a vertical displacement of a road surface, and a road surface displacement speed that is a time derivative of the road surface displacement. The "road surface displacement related value" may be the unsprung displacement that is the vertical displacement of the unsprung portion of the vehicle or the road surface displacement that is the vertical displacement of the road surface.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

First Embodiment

Structure

Figure 1:
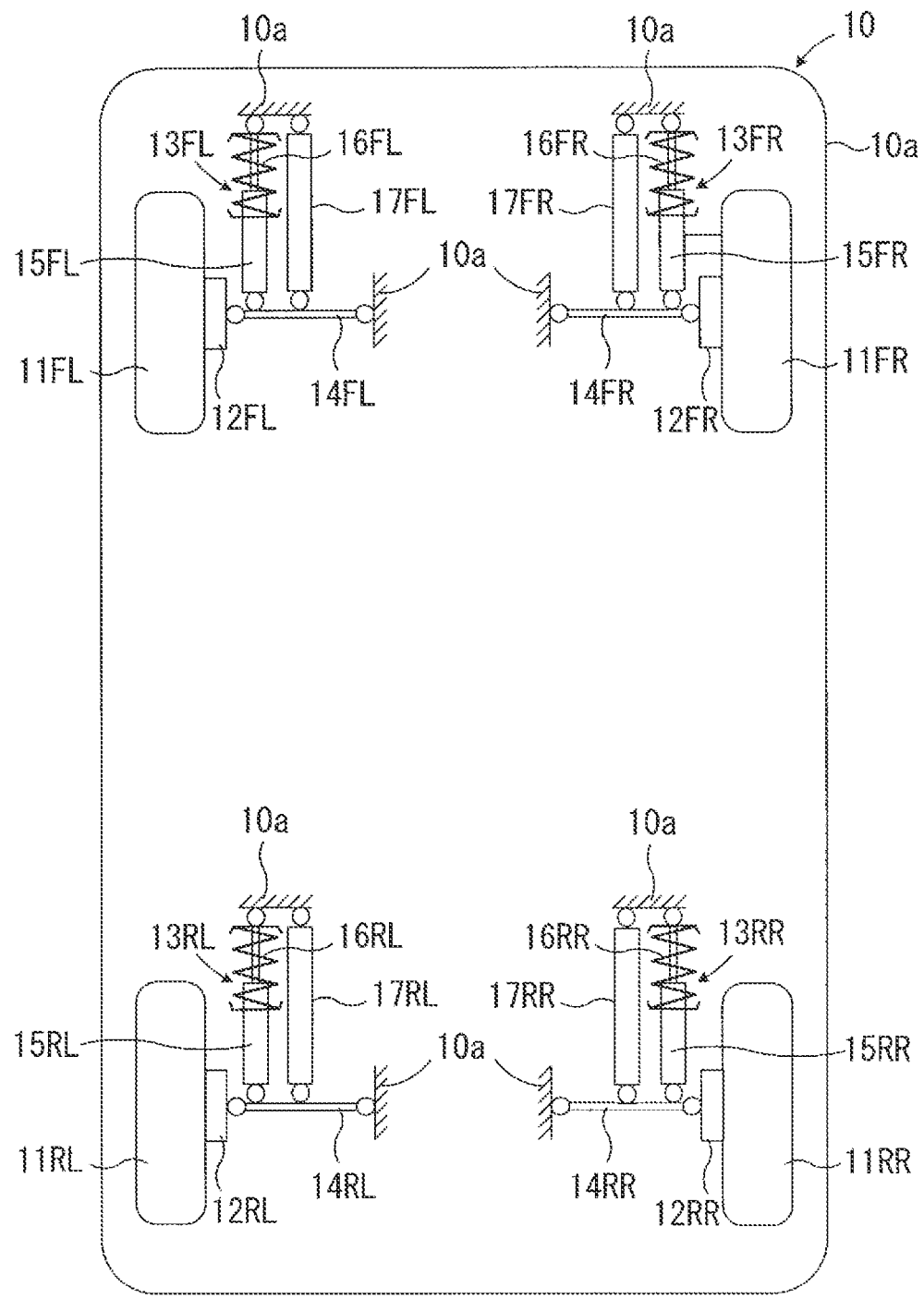
FIG. 1 is a schematic structural diagram of a vehicle to which damping control devices according to embodiments of the present disclosure are applied.
Figure 2:
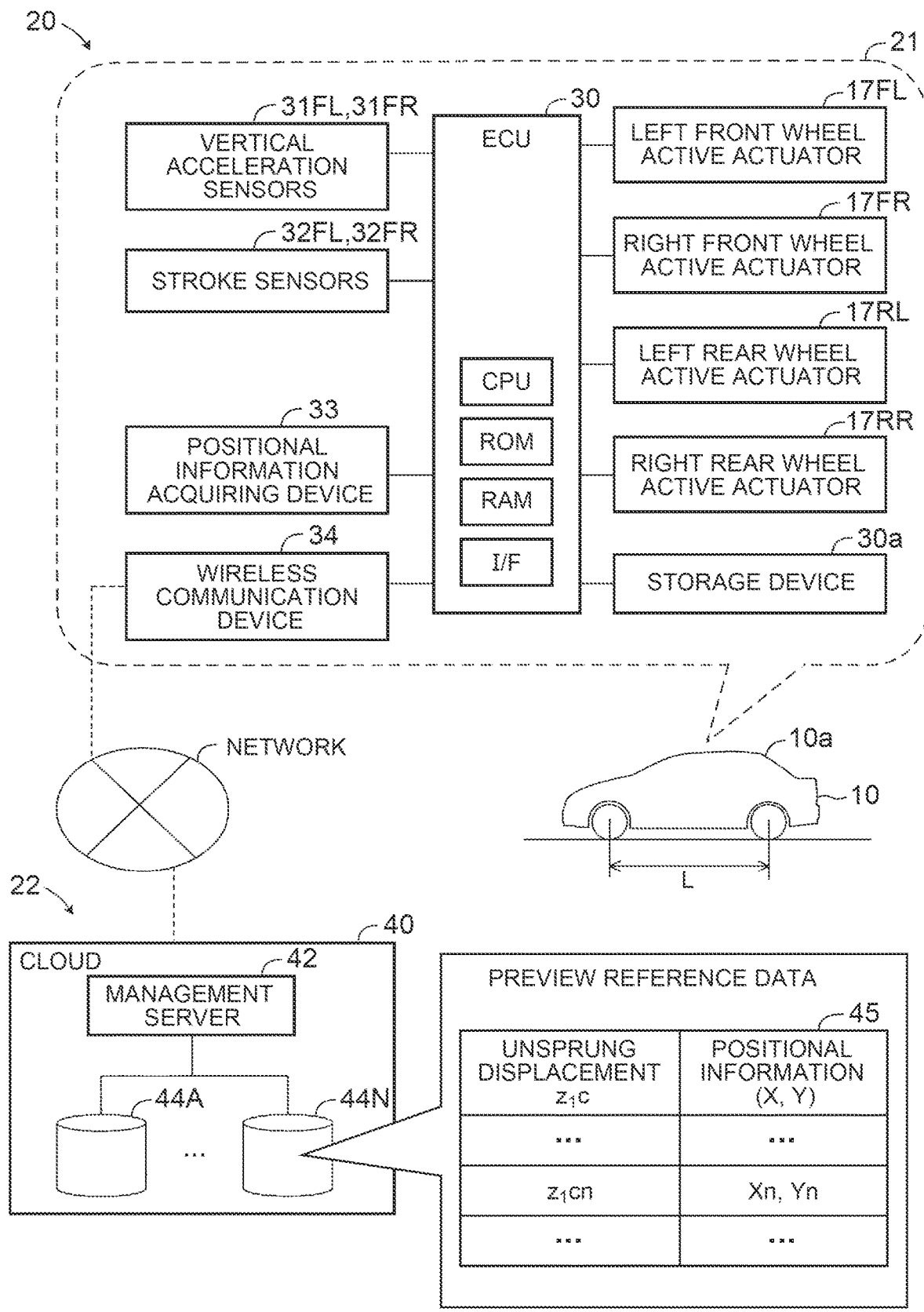
FIG. 2 is a schematic structural diagram of a damping control device according to a first embodiment of the present disclosure.

A damping control device for a vehicle according to a first embodiment of the present disclosure is generally represented by reference symbol 20 in FIG. 2. The damping control device 20 is applied to a vehicle 10 illustrated in FIG. 1.

The vehicle 10 includes a right front wheel 11FR, a left front wheel 11FL, a right rear wheel 11RR, and a left rear wheel 11RL. The right front wheel 11FR is rotatably supported by a wheel support member 12FR. The left front wheel 11FL is rotatably supported by a wheel support member 12FL. The right rear wheel 11RR is rotatably supported by a wheel support member 12RR. The left rear wheel 11RL is rotatably supported by a wheel support member 12RL.

The right front wheel 11FR, the left front wheel 11FL, the right rear wheel 11RR, and the left rear wheel 11RL are referred to as "wheels 11" unless otherwise distinguished. Similarly, the right front wheel 11FR and the left front wheel 11FL are referred to as "front wheels 11F". Similarly, the right rear wheel 11RR and the left rear wheel 11RL are referred to as "rear wheels 11R". The wheel support members 12FR to 12RL are referred to as "wheel support members 12".

The vehicle 10 further includes a right front wheel suspension 13FR, a left front wheel suspension 13FL, a right rear wheel suspension 13RR, and a left rear wheel suspension 13RL. Details of the suspensions 13FR to 13RL are described below. The suspensions 13FR to 13RL may be independent suspensions.

The right front wheel suspension 13FR suspends the right front wheel 11FR from a vehicle body 10a, and includes a suspension arm 14FR, a shock absorber 15FR, and a suspension spring 16FR. The left front wheel suspension 13FL suspends the left front wheel 11FL from the vehicle body 10a, and includes a suspension arm 14FL, a shock absorber 15FL, and a suspension spring 16FL.

The right rear wheel suspension 13RR suspends the right rear wheel 11RR from the vehicle body 10a, and includes a suspension arm 14RR, a shock absorber 15RR, and a suspension spring 16RR. The left rear wheel suspension 13RL suspends the left rear wheel 11RL from the vehicle body 10a, and includes a suspension arm 14RL, a shock absorber 15RL, and a suspension spring 16RL.

The right front wheel suspension 13FR, the left front wheel suspension 13FL, the right rear wheel suspension 13RR, and the left rear wheel suspension 13RL are referred to as "suspensions 13" unless otherwise distinguished. Similarly, the suspension arms 14FR to 14RL are referred to as "suspension arms 14". Similarly, the shock absorbers 15FR to 15RL are referred to as "shock absorbers 15". Similarly, the suspension springs 16FR to 16RL are referred to as "suspension springs 16".

The suspension arm 14 couples the wheel support member 12 to the vehicle body 10a. In FIG. 1, one suspension arm 14 is illustrated for one suspension 13, but a plurality of suspension arms 14 may be provided for one suspension 13.

The shock absorber 15 is arranged between the vehicle body 10a and the suspension arm 14, coupled to the vehicle body 10a at the upper end, and coupled to the suspension arm 14 at the lower end. The suspension spring 16 is resiliently mounted between the vehicle body 10a and the suspension arm 14 via the shock absorber 15. That is, the upper end of the suspension spring 16 is coupled to the vehicle body 10a, and the lower end of the suspension spring 16 is coupled to a cylinder of the shock absorber 15. In this resilient mounting structure of the suspension spring 16, the shock absorber 15 may be arranged between the vehicle body 10a and the wheel support member 12.

In this example, the shock absorber 15 is a non-adjustable shock absorber, but may be an adjustable shock absorber. The suspension spring 16 may resiliently be mounted between the vehicle body 10a and the suspension arm 14 without intervention of the shock absorber 15. That is, the upper end of the suspension spring 16 may be coupled to the vehicle body 10a, and the lower end of the suspension spring 16 may be coupled to the suspension arm 14. In this resilient mounting structure of the suspension spring 16, the shock absorber 15 and the suspension spring 16 may be arranged between the vehicle body 10a and the wheel support member 12.

Regarding the members such as the wheel 11 and the shock absorber 15 of the vehicle 10, a portion close to the wheel 11 with respect to the suspension spring 16 is referred to as "unsprung portion 50 (see FIG. 3)". Regarding the members such as the vehicle body 10a and the shock absorber 15 of the vehicle 10, a portion close to the vehicle body 10a with respect to the suspension spring 16 is referred to as "sprung portion 51 (see FIG. 3)".

A right front wheel active actuator 17FR, a left front wheel active actuator 17FL, a right rear wheel active actuator 17RR, and a left rear wheel active actuator 17RL are provided between the vehicle body 10a and the suspension arms 14FR to 14RL, respectively. The active actuators 17FR to 17RL are provided in parallel to the shock absorbers 15FR to 15RL and the suspension springs 16FR to 16RL, respectively.

The right front wheel active actuator 17FR, the left front wheel active actuator 17FL, the right rear wheel active actuator 17RR, and the left rear wheel active actuator 17RL are referred to as "active actuators 17" unless otherwise distinguished. Similarly, the right front wheel active actuator 17FR and the left front wheel active actuator 17FL are referred to as "front wheel active actuators 17F". Similarly, the right rear wheel active actuator 17RR and the left rear wheel active actuator 17RL are referred to as "rear wheel active actuators 17R".

The active actuator 17 functions as an actuator configured to adjustably generate a vertical force (hereinafter referred to as "control force") Fc acting between the vehicle body 10a and the wheel 11 (between the sprung portion 51 and the unsprung portion 50) to damp the sprung portion 51 based on a control command from an electronic control unit (hereinafter referred to as "ECU", and may be referred to as "control unit") 30 illustrated in FIG. 2. The active actuator 17 may be referred to as "control force generating device". In this example, the active actuator 17 is an electromagnetic active actuator. The active actuator 17 serves as an active suspension in cooperation with, for example, the shock absorber 15 and the suspension spring 16.

In the first embodiment, the damping control device 20 includes an on-board device 21 and an external device 22 as illustrated in FIG. 2. The on-board device 21 includes the ECU 30, a storage device 30a, a positional information acquiring device 33, and a wireless communication device 34. The on-board device 21 further includes the active actuators 17FR to 17RL.

The ECU 30 includes a microcomputer. The microcomputer includes a central processing unit (CPU), a read-only memory (ROM), a random-access memory (RAM), and an interface (I/F). The CPU executes instructions (programs or routines) stored in the ROM to implement various functions.

The ECU 30 is connected to the non-volatile storage device 30a in which information is readable and writable. In this example, the storage device 30a is a hard disk drive. The ECU 30 can store (save) information in the storage device 30a, and can read information stored (saved) in the storage device 30a. The storage device 30a is not limited to the hard disk drive, and may be a known storage device or storage medium in which information is readable and writable.

The on-board device 21 has vertical acceleration sensors 31FR and 31FL of the sprung portion and stroke sensors 32FR and 32FL. The vertical acceleration sensors and the stroke sensors are on-board sensors and connected to the ECU 30. As described later in detail, the ECU 30 functions as a road surface displacement related information acquiring device configured to acquire pieces of road surface displacement related information at positions of the right and left front wheels in cooperation with the vertical acceleration sensors and the stroke sensors.

The vertical acceleration sensors 31FR and 31FL of the sprung portion are provided on the vehicle body 10a (sprung portion 51) at portions corresponding to the right front wheel 11FR and the left front wheel 11FL, respectively. The vertical acceleration sensors 31FR and 31FL of the sprung portion detect vertical accelerations of corresponding portions of the sprung portion 51 (sprung accelerations $ddz_2fr$ and $ddz_2fl$), and output signals indicating the vertical accelerations to the ECU 30, respectively. The vertical acceleration sensors 31FR and 31FL are referred to as "vertical acceleration sensors 31" unless otherwise distinguished. Similarly, the sprung accelerations $ddz_2fr$ and $ddz_2fl$ are referred to as "sprung accelerations $ddz_2$".

The stroke sensors 32FR and 32FL are provided on the right front wheel suspension 13FR and the left front wheel suspension 13FL, respectively. The stroke sensors 32FR and 32FL detect vertical strokes Hfr and Hfl of the suspensions 13FR and 13FL, and output signals indicating the vertical strokes to the ECU 30, respectively. The strokes Hfr and Hfl are vertical strokes between the wheel support members 12FR and 12FL and portions of the vehicle body 10a (sprung portion 51) that correspond to the positions of the right front wheel 11FR and the left front wheel 11FL, respectively. The stroke sensors 32FR and 32FL are referred to as "stroke sensors 32" unless otherwise distinguished. Similarly, the strokes Hfr and Hfl are referred to as "strokes H".

The ECU 30 is connected to the positional information acquiring device 33 and the wireless communication device 34.

The positional information acquiring device 33 includes a global navigation satellite system (GNSS) receiver and a map database. The GNSS receiver receives "signal from artificial satellite (for example, GNSS signal)" for detecting a position of the vehicle 10 at a current time (current position). The map database stores road map information and the like. The positional information acquiring device 33 acquires the current position (for example, latitude and longitude) of the vehicle 10 based on the GNSS signal. Examples of the positional information acquiring device 33 include a navigation device.

The ECU 30 acquires "traveling direction Td of vehicle 10" at a current time based on records of current positions acquired by the positional information acquiring device 33. The GNSS signal contains a moving speed, and the ECU 30 determines "vehicle speed V1 of vehicle 10" at a current time based on the moving speed contained in the GNSS signal.

The wireless communication device 34 is a wireless communication terminal for communicating information with a cloud 40 of the external device 22 via a network. The cloud 40 includes "management server 42 and plurality of storage devices 44A to 44N" connected to the network. The one or more storage devices 44A to 44N are referred to as "storage devices 44" unless otherwise distinguished. The storage device 44 functions as an external storage device of the damping control device 20.

The management server 42 includes a CPU, a ROM, a RAM, and an interface (I/F). The management server 42 retrieves and reads data stored in the storage device 44, and writes data into the storage device 44.

The storage device 44 stores preview reference data 45. An unsprung displacement $z_1$ acquired based on a vertical motion condition amount of the vehicle 10 or another vehicle that is detected when the vehicle or the other vehicle has actually traveled on a road surface is registered in the preview reference data 45 while being linked to information on a position where the motion condition amount is detected. Thus, the preview reference data 45 is a combination of the unsprung displacement $z_1$ acquired based on the vertical motion condition amount of the vehicle or the other vehicle and the information on the position where the motion condition amount is detected.

The unsprung portion 50 is displaced in a vertical direction in response to a displacement of a road surface 55 when the vehicle 10 travels on the road surface 55. The unsprung displacement $z_1$ is the vertical displacement of the unsprung portion 50 corresponding to the position of each wheel 11 of the vehicle 10. The positional information is "information indicating position (for example, latitude and longitude) of wheel 11 where unsprung displacement $z_1$ is acquired" at a time when the unsprung displacement $z_1$ is acquired. FIG. 2 illustrates an unsprung displacement "$z_1cn$" and positional information "Xn, Yn" (n=1, 2, 3 . . . ) as examples of an unsprung displacement $z_1c$ and positional information registered in the preview reference data 45 while being linked to each other.

The ECU 30 is connected to the right front wheel active actuator 17FR, the left front wheel active actuator 17FL, the right rear wheel active actuator 17RR, and the left rear wheel active actuator 17RL via drive circuits (not illustrated).

The ECU 30 calculates a target control force Fct for damping the sprung portion 51 at each wheel 11 based on an unsprung displacement $z_1$ at a predicted passing position of the wheel 11 described later, and controls the active actuator 17 such that a control force Fc generated by the active actuator 17 becomes the target control force Fct when the wheel 11 passes through the predicted passing position.

Overview of Basic Preview Damping Control

Figure 3:
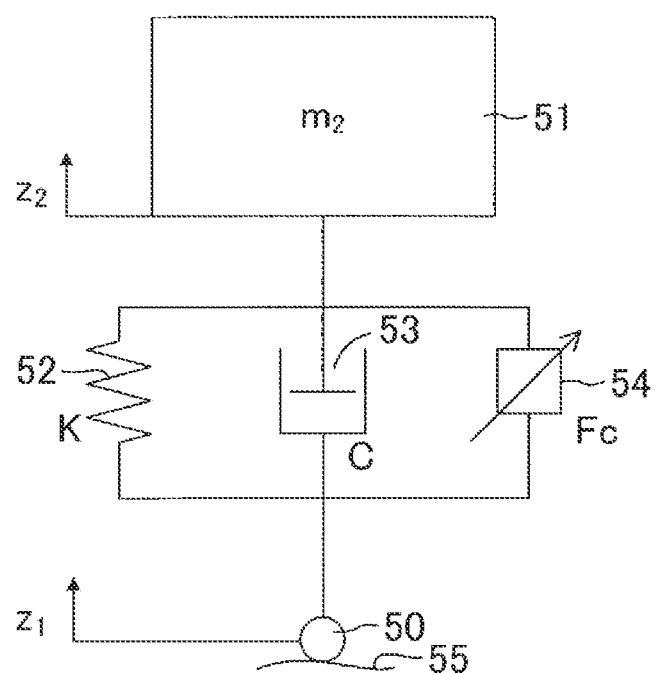
FIG. 3 is a diagram illustrating a single-wheel model of a vehicle.

An overview of preview damping control common to the embodiments to be executed by the damping control device 20 is described below. FIG. 3 illustrates a single-wheel model of the vehicle 10.

A spring 52 corresponds to the suspension spring 16. A damper 53 corresponds to the shock absorber 15. An actuator 54 corresponds to the active actuator 17.

In FIG. 3, a mass of the sprung portion 51 is referred to as "sprung mass $m_2$". A vertical displacement of the unsprung portion 50 is referred to as "unsprung displacement $z_1$". A vertical displacement of the sprung portion 51 is referred to as "sprung displacement $z_2$". The sprung displacement $z_2$ is a vertical displacement of the sprung portion 51 associated with a position of each wheel 11. A spring rate (equivalent spring rate) of the spring 52 is referred to as "spring rate K". A damping coefficient (equivalent damping coefficient) of the damper 53 is referred to as "damping coefficient C". A force generated by the actuator 54 is referred to as "control force Fc".

Time derivatives of $z_1$ and $z_2$ are represented by "$dz_1$" and "$dz_2$", respectively. Second-order time derivatives of $z_1$ and $z_2$ are represented by "$ddz_1$" and "$ddz_2$", respectively. An upward displacement of each of $z_1$ and $z_2$ is positive, and an upward force generated by each of the spring 52, the damper 53, and the actuator 54 is positive.

In the single-wheel model of the vehicle 10 illustrated in FIG. 2, an equation of motion regarding a vertical motion of the sprung portion 51 can be represented by Expression (1).

$$m_2 ddz_2 = C(dz_1 - dz_2) + K(z_1 - z_2) - Fc \quad (1)$$

In Expression (1), the damping coefficient C is assumed to be constant. However, an actual damping coefficient changes depending on a stroke speed of the suspension 13. Therefore, the damping coefficient may variably be set depending on, for example, a time derivative of a stroke H.

When vibration of the sprung portion 51 is completely canceled out by the control force Fc (that is, when the sprung acceleration $ddz_2$, the sprung speed $dz_2$, and the sprung displacement $z_2$ are "0"), the control force Fc is represented by Expression (2).

$$Fc = C dz_1 + K z_1 \quad (2)$$

Thus, a control force Fc for reducing the vibration of the sprung portion 51 can be represented by Expression (3) by setting a control gain to α. The control gain α is an arbitrary constant larger than 0 and equal to or smaller than 1.

$$Fc = \alpha(C dz_1 + K z_1) \quad (3)$$

When Expression (3) is applied to Expression (1), Expression (1) can be represented by Expression (4).

$$m_2 ddz_2 = C(dz_1 - dz_2) + K(z_1 - z_2) - \alpha(C dz_1 + K z_1) \quad (4)$$

When Expression (4) is subjected to Laplace transform and the resultant expression is rearranged, Expression (4) can be represented by Expression (5). That is, a transfer function from the unsprung displacement $z_1$ to the sprung displacement $z_2$ is represented by Expression (5). In Expression (5), "s" represents a Laplace operator.

$$\frac{z_2}{z_1} = \frac{(1-\alpha)(Cs+K)}{m_2 s^2 + Cs + K} \quad (5)$$

According to Expression (5), the value of the transfer function changes depending on α, and is minimum when α is 1. Thus, the target control force Fct can be represented by Expression (6) associated with Expression (3). In Expression (6), a gain $\beta_1$ corresponds to αCs, and a gain $\beta_2$ corresponds to αK.

$$Fct = \beta_1 \times dz_1 + \beta_2 \times z_1 \quad (6)$$

Thus, the ECU 30 calculates the target control force Fct by acquiring in advance (previewing) an unsprung displacement $z_1$ at a position where the wheel 11 passes afterwards (predicted passing position), and applying the acquired unsprung displacement $z_1$ to Expression (6). The ECU 30 causes the actuator 54 to generate a control force Fc corresponding to the target control force Fct at a timing when the wheel 11 passes through the predicted passing position (that is, at a timing when the unsprung displacement $z_1$ applied to Expression (6) occurs). With this configuration, it is possible to reduce the vibration of the sprung portion 51 that occurs when the wheel 11 passes through the predicted passing position (that is, when the unsprung displacement $z_1$ applied to Expression (6) occurs).

The control described above is damping control for the sprung portion 51. The damping control for the sprung portion 51 based on the unsprung displacement $z_1$ acquired in advance is referred to as "preview damping control".

In the single-wheel model, the mass of the unsprung portion 50 and elastic deformation of tires are ignored, and a road surface displacement $z_0$ is assumed to be identical to the unsprung displacement $z_1$. Thus, similar preview damping control may be executed by using the road surface displacement $z_0$ in place of the unsprung displacement $z_1$.

Expression (7) is an expression for simply calculating the target control force Fct by omitting the derivative term ($\beta_1 \times dz_1$) of Expression (6). Also in the case where the target control force Fct is calculated based on Expression (7), the actuator 54 generates the control force ($=\beta_2 \times z_1$) for reducing the vibration of the sprung portion 51. Thus, the vibration of the sprung portion 51 can be reduced as compared to a case where the control force is not generated.

$$Fct = \beta_2 \times z_1 \quad (7)$$

Since the target control force Fct calculated based on Expression (7) does not contain the control force of the derivative term ($=\beta_1 \times dz_1$), the effect of reducing the vibration of the sprung portion 51 is lower than that in the case where the target control force Fct is calculated based on Expression (6).

The phase of the unsprung speed $dz_1$ in Expression (6) advances by 90 degrees from the phase of the unsprung displacement $z_1$. In the damping control device 20 of the present disclosure, the value of the unsprung displacement $z_1$ whose phase is advanced is represented by "$z_1 a$", and the target control force Fct is calculated based on Expression (8) associated with Expression (7) by using the unsprung displacement $z_1 a$ having the advanced phase. Thus, the target control force Fct can be calculated more simply than the case where Expression (6) is used, and the vibration of the sprung portion 51 can be reduced more effectively than the case where the target control force Fct is calculated based on Expression (7).

$$Fct = \beta_2 \times z_1 a \quad (8)$$

Preview Damping Control for Front Wheel and Rear Wheel

Next, preview damping control for the front wheel and the rear wheel that is common to the embodiments is described with reference to FIG. 4 to FIG. 6.

Figure 4:
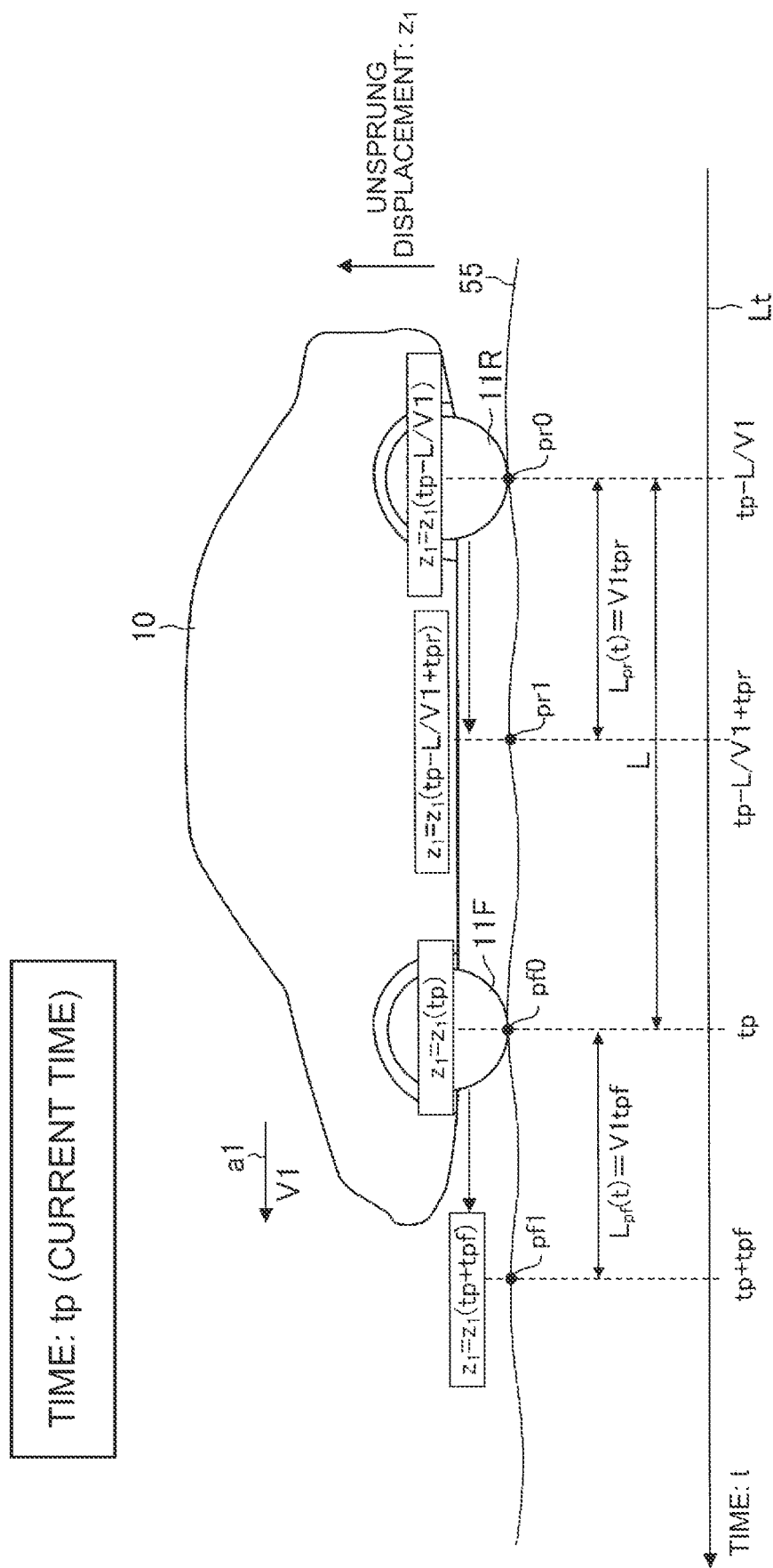
FIG. 4 is a diagram for describing preview damping control.

FIG. 4 illustrates the vehicle 10 traveling at a vehicle speed V1 in a direction indicated by an arrow a1 at a current time tp. In the following description, the front wheel 11F and the rear wheel 11R are wheels on the same side, and the moving speeds of the front wheel 11F and the rear wheel 11R are equal to the vehicle speed V1.

In FIG. 4, a line Lt is a virtual time axis. Unsprung displacements $z_1$ of the front wheel 11F on a movement path at current, past, and future times t are represented by a function $z_1(t)$ of the virtual time axis t indicated by the line Lt. Thus, an unsprung displacement $z_1$ of the front wheel 11F at a position (contact point) pf0 at the current time tp is represented by $z_1(tp)$. An unsprung displacement $z_1$ of the rear wheel 11R at a position pr0 at the current time tp corresponds to an unsprung displacement $z_1$ of the front wheel 11F at a time "tp−L/V1" earlier than the current time tp by "period (L/V1) required for front wheel 11F to move by wheelbase L". Thus, the unsprung displacement $z_1$ of the rear wheel 11R at the current time tp is represented by $z_1(tp-L/V1)$.

Preview Damping Control for Front Wheel 11F

The ECU 30 determines a predicted passing position pf1 of the front wheel 11F at a time later (in the future) than the current time tp by a front wheel preview period tpf. The front wheel preview period tpf is preset to a period required from the timing when the ECU 30 determines the predicted passing position pf1 to the timing when the front wheel active actuator 17F outputs a control force Fcf corresponding to a target control force Fcft.

The predicted passing position pf1 of the front wheel 11F is a position spaced away from the position pf0 at the current time tp by a front wheel preview distance $L_{pf}(=V1 \times tpf)$ along a front wheel predicted movement path where the front wheel 11F is predicted to move in the future. As described later in detail, the position pf0 is calculated based on a current position of the vehicle 10 that is acquired by the positional information acquiring device 33.

The ECU 30 acquires in advance a part of the preview reference data 45 in an area near the current position of the vehicle 10 (preparatory zone described later) from the cloud 40. In the present disclosure, the unsprung displacement $z_1a$ having the advanced phase is used in place of the unsprung displacement $z_1$ as described above. A preview period increase amount corresponding to the advanced phase is represented by "Δtpf". The ECU 30 acquires an unsprung displacement $z_1(tp+tpf+\Delta tpf)$ based on the determined predicted passing position pf1, the part of the preview reference data 45 acquired in advance, and the preview period increase amount Δtpf.

The ECU 30 may acquire the unsprung displacement $z_1(tp+tpf+\Delta tpf)$ as follows. First, the ECU 30 transmits the determined predicted passing position pf1 to the cloud 40. The cloud 40 acquires the unsprung displacement $z_1(tp+tpf+\Delta tpf)$ linked to positional information indicating the predicted passing position pf1 based on the predicted passing position pf1, the preview reference data 45, and the preview period increase amount Δtpf. The cloud 40 transmits the unsprung displacement $z_1(tp+tpf+\Delta tpf)$ to the ECU 30.

The ECU 30 applies an unsprung displacement $z_1a(tp+tpf+\Delta tpf)$ having an advanced phase to an unsprung displacement $z_1a$ in Expression (9) associated with Expression (8), thereby calculating a target control force Fcft $(=\beta_f \times z_1 a(tp+tpf+\Delta tpf))$.

$$Fcft = \beta_f \times z_1 a \quad (9)$$

The ECU 30 transmits a control command containing the target control force Fcft to the front wheel active actuator 17F to cause the front wheel active actuator 17F to generate a control force Fcf that corresponds to (agrees with) the target control force Fcft.

Figure 5:
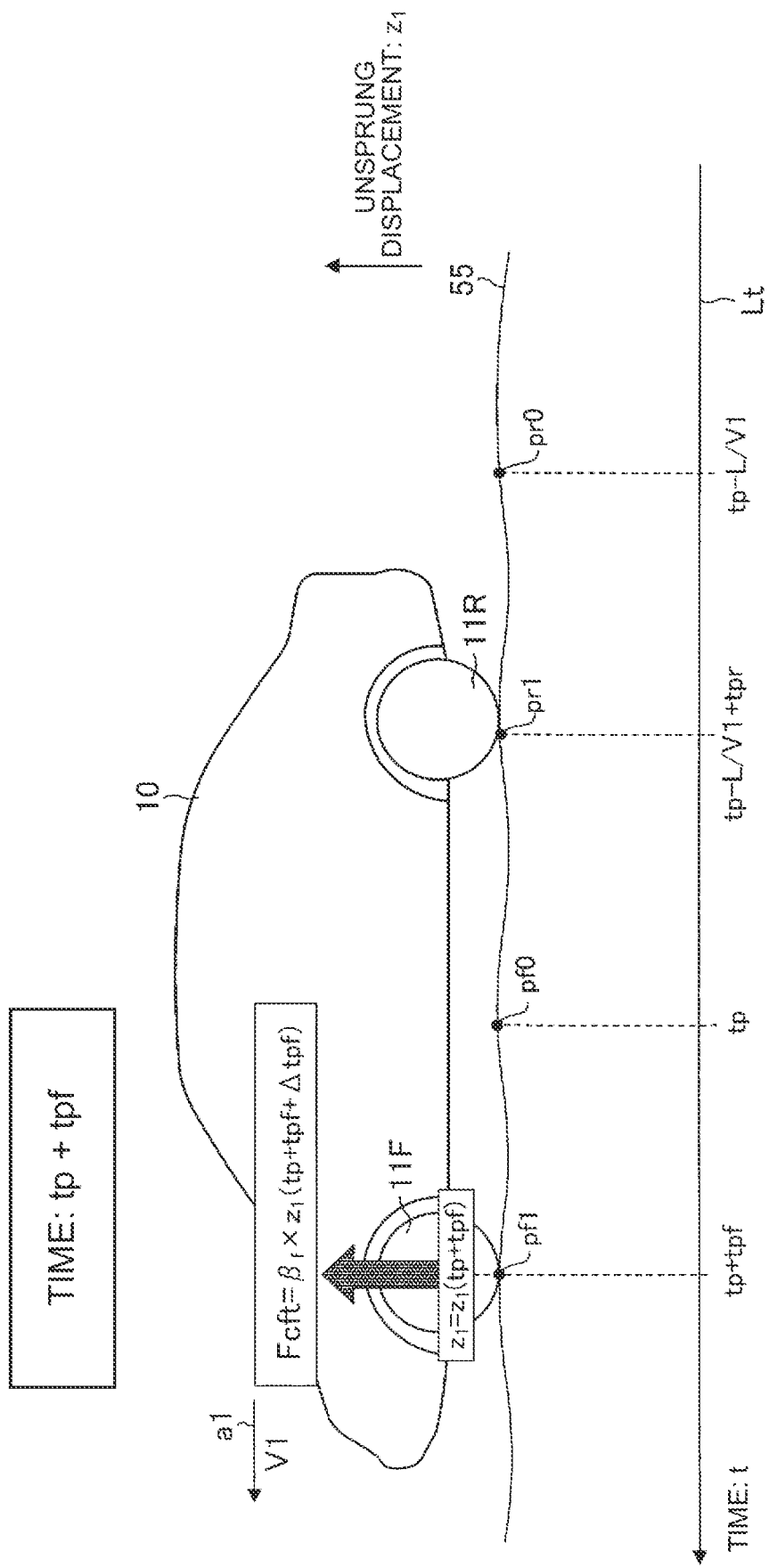
FIG. 5 is a diagram for describing the preview damping control.

As illustrated in FIG. 5, the front wheel active actuator 17F generates the control force Fcf corresponding to the target control force Fcft at "time tp+tpf" (that is, at a timing when the front wheel 11F actually passes through the predicted passing position pf1) later than the current time tp by the front wheel preview period tpf. Thus, the front wheel active actuator 17F can generate, at an appropriate timing, the control force Fcf for absorbing a vibration force that occurs due to the unsprung displacement $z_1$ of the front wheel 11F at the predicted passing position pf1. Accordingly, the vibration of the sprung portion 51 can be reduced appropriately.

Preview Damping Control for Rear Wheel 11R

The ECU 30 determines a predicted passing position pr1 of the rear wheel 11R at a time later (in the future) than the current time tp by a rear wheel preview period tpr. The rear wheel preview period tpr is preset to a period required from the timing when the ECU 30 determines the predicted passing position pr1 to the timing when the rear wheel active actuator 17R outputs a control force Fcr corresponding to a target control force Fcrt.

If the front wheel active actuator 17F and the rear wheel active actuator 17R are different, the front wheel preview period tpf and the rear wheel preview period tpr are preset to different values. If the front wheel active actuator 17F and the rear wheel active actuator 17R are the same, the front wheel preview period tpf and the rear wheel preview period tpr are preset to the same value.

The ECU 30 determines, as the predicted passing position pr1, a position spaced away from the position pr0 at the current time tp by a rear wheel preview distance $L_{pr}(=V1 \times tpr)$ along a predicted movement path of the rear wheel 11R under the assumption that the rear wheel 11R moves along the same path as that of the front wheel 11F. As described later in detail, the position pr0 is calculated based on the current position of the vehicle 10 that is acquired by the positional information acquiring device 33.

An unsprung displacement $z_1$ at the predicted passing position pr1 can be represented by $z_1(tp-L/V1+tpr)$ because this unsprung displacement $z_1$ occurs at a time later than "time (tp−L/V1) when front wheel 11F was located at position pr of rear wheel 11R at current time" by the rear wheel preview period tpr.

In the present disclosure, the unsprung displacement $z_1a$ having the advanced phase is used in place of the unsprung displacement $z_1$ as described above. A preview period increase amount corresponding to the advanced phase is represented by "Δtpr". The ECU 30 acquires an unsprung displacement $z_1(tp-L/V1+tpr+\Delta tpr)$ based on the determined predicted passing position pr1, the part of the preview reference data 45 acquired in advance, and the preview period increase amount Δtpr. The preview period increase amount Δtpr may be equal to the preview period increase amount Δtpf.

The ECU 30 may acquire the unsprung displacement $z_1(tp-L/V1+tpr+\Delta tpr)$ as follows. First, the ECU 30 transmits the determined predicted passing position pr1 to the cloud 40. The cloud 40 acquires the unsprung displacement $z_1(tp-L/V1+tpr+\Delta tpr)$ linked to positional information indicating the predicted passing position pr1 based on the predicted passing position pr1, the preview reference data 45, and the preview period increase amount Δtpr. The cloud 40 transmits the unsprung displacement $z_1(tp-L/V1+tpr+\Delta tpr)$ to the ECU 30.

The ECU 30 applies an unsprung displacement $z_1a(tp-L/V1+tpr+\Delta tpr)$ having an advanced phase to an unsprung displacement $z_1a$ in Expression (10) associated with Expression (8), thereby calculating a target control force Fcrt $(=\beta_r \times z_1 a(tp-L/V1+tpr+\Delta tpr))$.

$$Fcrt=\beta_r \times z_1 a \qquad (10)$$

The gain $\beta_f$ in Expression (9) and the gain $\beta_r$ in Expression (10) are set to different values. This is because a spring rate Kf of the right front wheel suspension 13FR and the left front wheel suspension 13FL differs from a spring rate Kr of the right rear wheel suspension 13RR and the left rear wheel suspension 13RL. The gains $\beta_f$ and $\beta_r$ may be referred to as "gains $\beta$" unless otherwise distinguished.

The ECU 30 transmits a control command containing the target control force Fcrt to the rear wheel active actuator 17R to cause the rear wheel active actuator 17R to generate a control force Fcr that corresponds to (agrees with) the target control force Fcrt.

Figure 6:
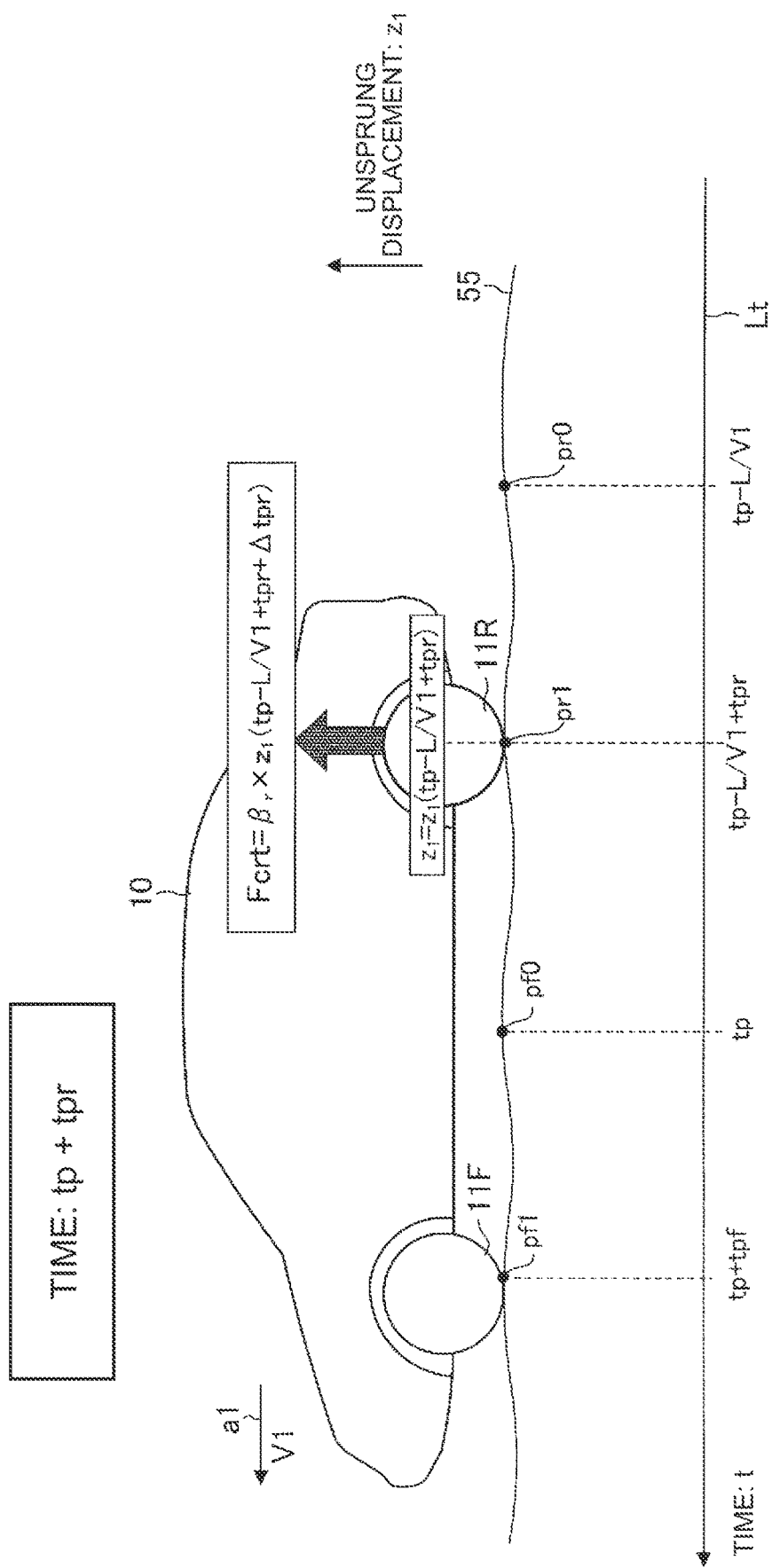
FIG. 6 is a diagram for describing the preview damping control.

As illustrated in FIG. 6, the rear wheel active actuator 17R generates the control force Fcr corresponding to the target control force Fcrt at "time tp+tpr" later than the current time tp by the rear wheel preview period tpr. Thus, the rear wheel active actuator 17R can generate, at an appropriate timing, the control force Fcr for absorbing a vibration force that occurs due to the unsprung displacement $z_1$ of the rear wheel 11R at the predicted passing position pr1. Accordingly, the vibration of the sprung portion 51 can be reduced appropriately.

Damping Control Routine of First Embodiment

Figure 7:
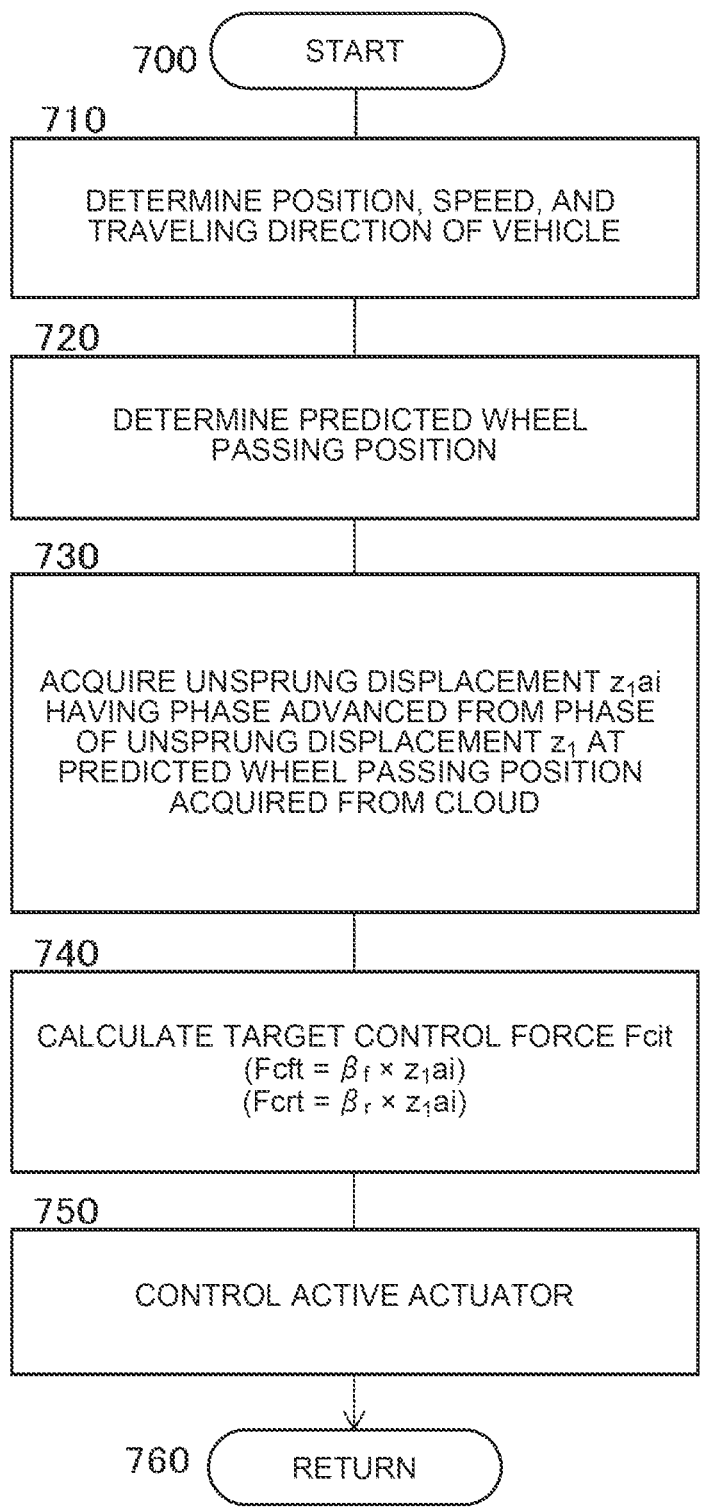
FIG. 7 is a flowchart illustrating a damping control routine for the vehicle according to the first embodiment.

The CPU of the ECU 30 executes a damping control routine illustrated in a flowchart of FIG. 7 every time a predetermined period has elapsed. The term "CPU" refers to the CPU of the ECU 30 unless otherwise noted.

At a predetermined timing, the CPU starts a process from Step 700 of FIG. 7, executes Step 710 to Step 750, and proceeds to Step 760 to temporarily terminate this routine in order of, for example, the left front wheel, the right front wheel, the left rear wheel, and the right rear wheel. A symbol "i" in an unsprung displacement $z_1 si$ or the like repeatedly changes in order of "fl", "fr", "rl", and "rr".

Step 710: The CPU acquires information related to a current position of the vehicle 10 from the positional information acquiring device 33, and determines (acquires) current positions of the wheels 11, a vehicle speed V1, and a traveling direction Td of the vehicle 10.

More specifically, the CPU maps a current position in a previous case and a current position in a present case on the road map information contained in the map database, and determines, as the traveling direction Td of the vehicle 10, a direction from the current position in the previous case to the current position in the present case. The current position in the previous case means a current position of the vehicle 10 that is acquired by the CPU in Step 710 of the previously executed routine. The current position in the present case means a current position of the vehicle 10 that is acquired by the CPU in Step 710 of the present routine.

The ROM of the ECU 30 prestores positional relationship data indicating relationships between a mounting position of the GNSS receiver in the vehicle 10 and the positions of the wheels 11. The current position of the vehicle 10 that is acquired from the positional information acquiring device 33 corresponds to the mounting position of the GNSS receiver. Therefore, the CPU determines the current positions of the wheels 11 by referring to the current position of the vehicle 10, the traveling direction Td of the vehicle 10, and the positional relationship data.

The GNSS signal received by the positional information acquiring device 33 contains information related to a moving speed. The CPU determines the vehicle speed V1 based on the GNSS signal.

Step 720: The CPU determines a front wheel predicted movement path and a rear wheel predicted movement path as follows. The front wheel predicted movement path is a path where the front wheel 11F is predicted to move in the future. The rear wheel predicted movement path is a path where the rear wheel 11R is predicted to move in the future. For example, the CPU determines the front wheel predicted movement path and the rear wheel predicted movement path based on the current positions of the wheels 11, the traveling direction Td of the vehicle 10, and the positional relationship data.

The CPU determines, as right and left front wheel predicted movement paths, paths where the right and left front wheels 11FR and 11FL are predicted to move when the vehicle 10 travels along the traveling direction Td, based on the current positions of the wheels 11, the traveling direction Td of the vehicle 10, and the positional relationship data.

As described above, the CPU calculates a front wheel preview distance $L_{pf}$ by multiplying the vehicle speed V1 by the front wheel preview period tpf, and determines a front wheel predicted passing position pf1. Similarly, the CPU calculates a rear wheel preview distance $L_{pr}$ by multiplying the vehicle speed V1 by the rear wheel preview period tpr, and determines a rear wheel predicted passing position pr1.

More specifically, the CPU determines, as right and left front wheel predicted passing positions pfr1 and pfl1, positions of the right and left front wheels 11FR and 11FL that advance from their current positions by the front wheel preview distance $L_{pf}$ along the right and left front wheel predicted movement paths. The CPU determines, as right and left rear wheel predicted passing positions prr1 and prl1, positions of the right and left rear wheels 11RR and 11RL that advance from their current positions by the rear wheel preview distance $L_{pr}$ along right and left rear wheel predicted movement paths.

Step 730: The CPU acquires an unsprung displacement $z_1 ai$ at the predicted passing position of each wheel from among "unsprung displacements $z_1$ in preparatory zone" described later, which are acquired in advance from the preview reference data 45 in the cloud 40.

The preparatory zone has a start point at a front wheel predicted passing position pf1 when the vehicle 10 reaches the end point of a previous preparatory zone, and has an end point at a position spaced away from the front wheel predicted passing position pf1 by a predetermined preparatory distance along the front wheel predicted movement path. The preparatory distance is preset to a value sufficiently larger than the front wheel preview distance $L_{pf}$.

As described above, the unsprung displacement $z_1 ai$ is a value obtained by advancing the phase of an unsprung displacement $z_1 i$ by a preset phase advance amount Phad to advance the phase of a transfer function from the unsprung displacement $z_1$ to a target control force Fcit. In this embodiment, the phase advance amount Phad is a value larger than 0 degrees, and is a value larger than 0 degrees and smaller than 180 degrees for a predetermined frequency fad between a sprung resonance frequency fres and an unsprung resonance frequency freu of the vehicle 10. The predetermined frequency fad may be set based on a major frequency of sprung vibration to be damped by the damping control device 20.

The waveform of the unsprung displacement $z_1$ may be regarded as a sinusoidal waveform. Assuming that the phase advance amount Phad is a value Phad1 smaller than 90 degrees, the value of the unsprung displacement $z_1$a having the phase advanced by the phase advance amount Phad1 is equal to a value of an unsprung displacement $z_1$ having a phase advanced by a phase advance amount Phad2 (=180 degrees−Phad1). Since the phase advance amount Phad is larger than 0 degrees and smaller than 180 degrees as described above, the phase advance amount Phad for acquiring the unsprung displacement $z_1$ai having the advanced phase may be either one of Phad1 and Phad2.

Since Phad2 is larger than Phad1, the preview period increase amount (Δtpf, Δtpr) for advancing the phase of the unsprung displacement $z_1$ by Phad2 is larger than the preview period increase amount for advancing the phase of the unsprung displacement $z_1$ by Phad1. To reduce the preview period increase amount, the phase advance amount Phad is larger than 0 degrees and smaller than 90 degrees for the predetermined frequency fad. Even when the phase advance amount Phad is larger than 0 degrees and smaller than 90 degrees for the predetermined frequency fad, the phase advance amount may be larger than 90 degrees or even larger than 180 degrees for a frequency higher than the predetermined frequency fad.

Figure 13:
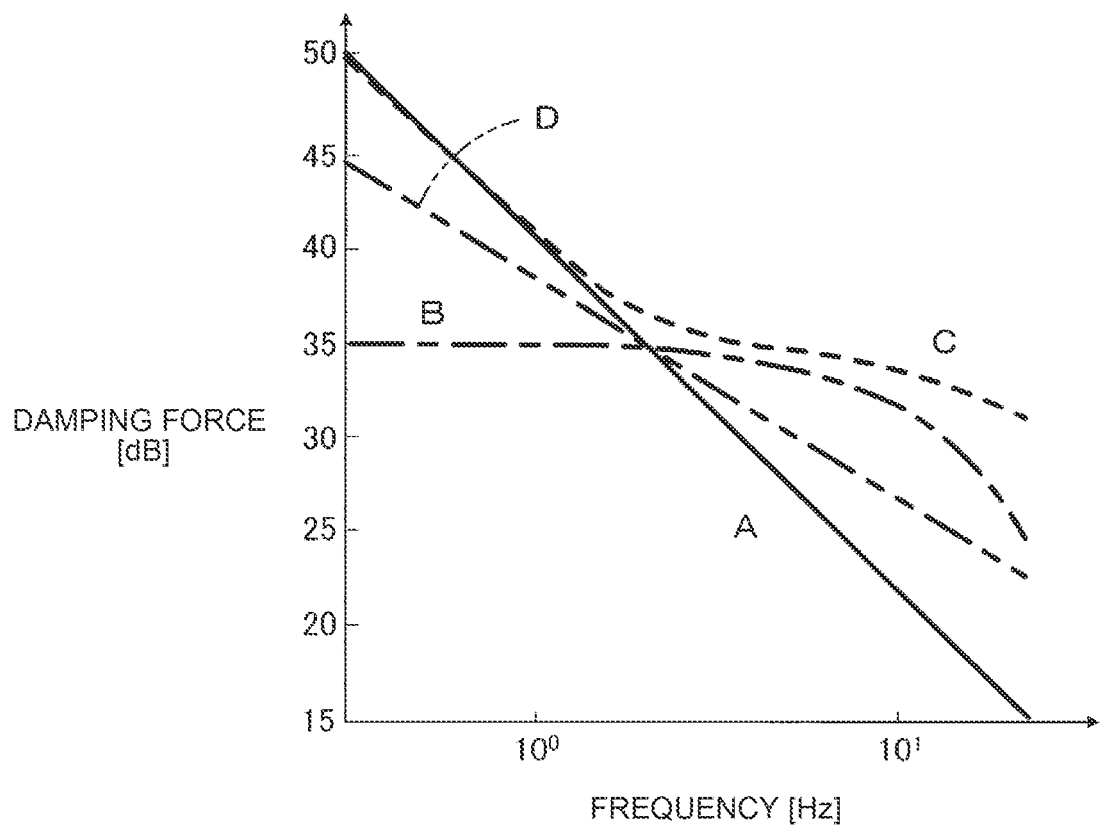
FIG. 13 is a diagram illustrating relationships between a frequency of an unsprung displacement and a damping force in a related-art damping device and a damping device of the present disclosure.

As understood from FIG. 13, in a frequency range higher than a medium frequency (for example, 2 to 3 Hz), a damping force in a case D where the phase of the unsprung displacement $z_1$ is advanced is larger than a damping force in a case A where a target damping control force is proportional to a road surface displacement related value, but is smaller than a damping force in a case B where the target damping control force is proportional to a time derivative of the road surface displacement related value. Conversely, in a frequency range lower than the medium frequency, the damping force in the case D where the phase of the unsprung displacement $z_1$ is advanced is larger than the damping force in the case B where the target damping control force is proportional to the time derivative of the road surface displacement related value, but is smaller than the damping force in the case A where the target damping control force is proportional to the road surface displacement related value. To secure the damping effect in a wide frequency range between, for example, the sprung resonance frequency and the unsprung resonance frequency of the vehicle, the phase advance amount Phad is a value equal to or larger than 40 degrees and equal to or smaller than 50 degrees, and is typically 45 degrees.

Step 740: The CPU calculates target control forces Fcfrt and Fcflt of the active actuators 17FR and 17FL at the right and left front wheels by using Expression (11) associated with Expression (9) based on the unsprung displacements $z_1$ai having the advanced phases at the predicted passing positions of the right and left front wheels. Similarly, the CPU calculates target control forces Fcrrt and Fcrlt of the active actuators 17RR and 17RL at the right and left rear wheels by using Expression (12) associated with Expression (10) based on the unsprung displacements $z_1$ai having the advanced phases at the predicted passing positions of the right and left rear wheels.

$$Fcft=\beta_f \times z_1 ai \qquad (11)$$

$$Fcrt=\beta_r \times z_1 ai \qquad (12)$$

Step 750: The CPU transmits control commands containing the target control forces Fcit to the active actuators 17 at the individual wheels to control the active actuators to generate control forces Fc equal to the target control forces Fcit, respectively. Each active actuator outputs the control force corresponding to the target control force Fcti at a timing when each wheel 11 passes through the corresponding predicted passing position.

Unsprung Displacement Collection Routine

Figure 8:
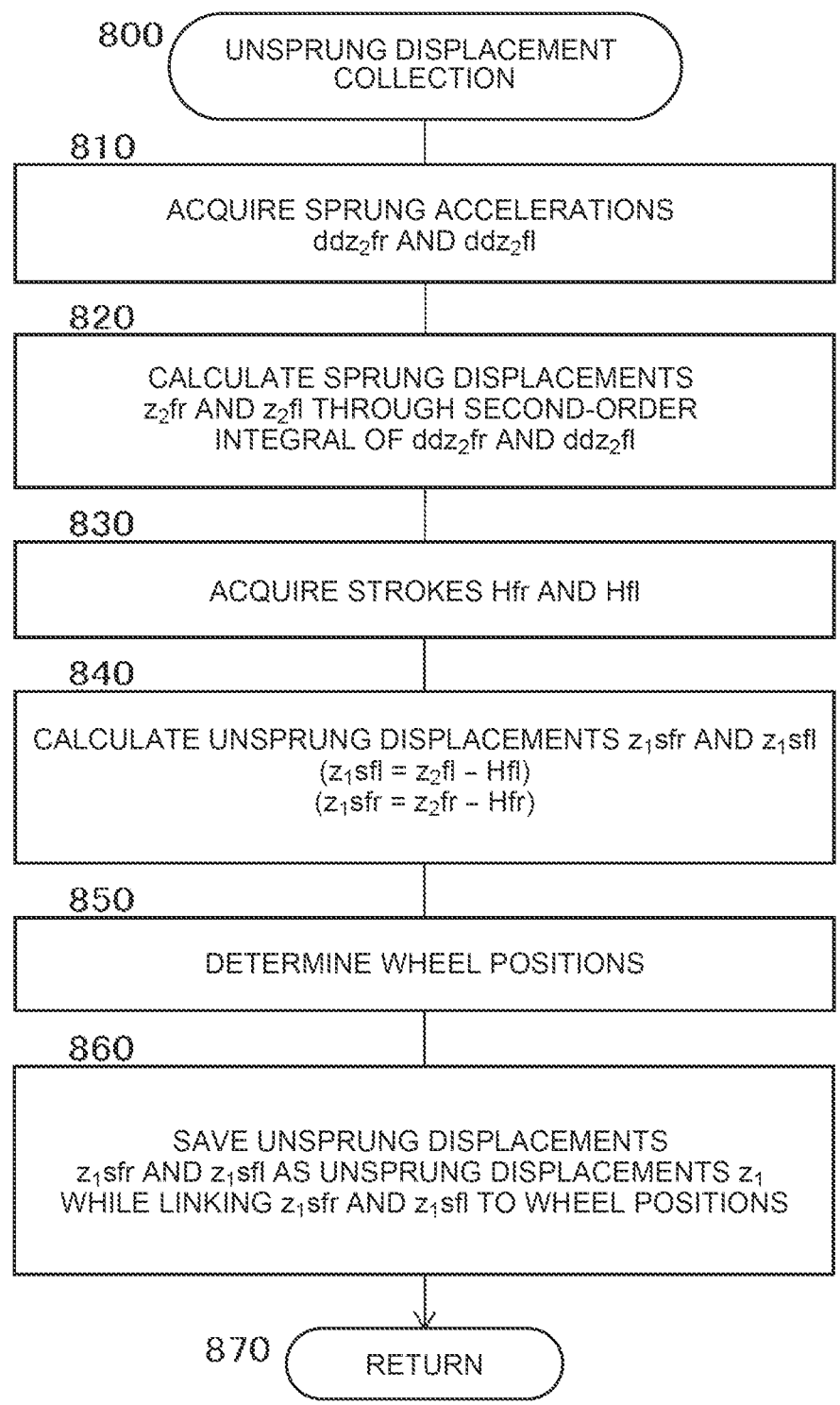
FIG. 8 is a flowchart illustrating an unsprung displacement collection routine.

The CPU of the ECU 30 executes an unsprung displacement collection routine illustrated in a flowchart of FIG. 8 every time a predetermined period has elapsed. This routine is also executed for each wheel.

At a predetermined timing, the CPU starts a process from Step 800 of FIG. 8, executes Step 810 to Step 860 in this order, and proceeds to Step 870 to temporarily terminate this routine.

Step 810: The CPU acquires sprung accelerations ddz$_2$fr and ddz$_2$fl from the vertical acceleration sensors 31FR and 31FL, respectively.

Step 820: The CPU calculates sprung displacements $z_2$fr and $z_2$fl through second-order integral of the sprung accelerations ddz$_2$fr and ddz$_2$fl acquired in Step 810, respectively.

Step 830: The CPU acquires suspension strokes Hfr and Hfl from the stroke sensors 32FR and 32FL, respectively.

Step 840: The CPU calculates unsprung displacements $z_1$sfr and $z_1$sfl at the positions of the right and left front wheels by subtracting the suspension strokes Hfr and Hfl from the sprung displacements $z_2$fr and $z_2$fl, respectively. That is, the CPU calculates the unsprung displacements $z_1$sfr and $z_1$sfl at the positions of the right and left front wheels based on Expressions (13) and (14).

$$z_1 sfl = z_2 fl - Hfl \qquad (13)$$

$$z_1 sfr = z_2 fr - Hfr \qquad (14)$$

Step 850: The CPU acquires, from the positional information acquiring device 33, pieces of information related to a position and a traveling direction Td of the vehicle 10 when the sprung accelerations ddz$_2$fr and ddz$_2$fl are detected, and determines (acquires) positions of the wheels based on those pieces of information and the positional relationships between the positional information acquiring device 33 and the wheels 11.

Step 860: The CPU saves the unsprung displacements $z_1$sfr and $z_1$sfl in the storage device 30a as unsprung displacements $z_1$ while linking the unsprung displacements $z_1$sfr and $z_1$sfl to pieces of information on the positions of the wheels when the sprung accelerations ddz$_2$fr and ddz$_2$fl are detected.

Although illustration is omitted, when a predetermined condition is satisfied, the CPU transmits the unsprung displacements $z_1$ and the pieces of positional information saved in the storage device 30a to the cloud 40 as collected data.

As understood from the above, the ECU 30 of the first embodiment calculates the target control force as a value proportional to the unsprung displacement $z_1$ai having the advanced phase to advance the phase of the transfer function from the unsprung displacement $z_1$i to the target control force Fcit by the phase advance amount larger than 0 degrees and smaller than 180 degrees.

The target control force calculated as the value proportional to the unsprung displacement $z_1$ai having the advanced phase is close to a target control force calculated as the sum of a control component proportional to an unsprung speed dz$_1$i and a control component proportional to the unsprung displacement $z_1$i. Thus, the damping performance for the sprung portion can be improved particularly at a frequency equal to or higher than the medium frequency as compared to a case where the phase of the unsprung displacement $z_1i$ is not advanced.

Particularly when the phase advance amount Phad is larger than 0 degrees and smaller than 90 degrees, the preview period increase amount for advancing the phase of the unsprung displacement $z_1$ can be reduced as compared to a case where the phase advance amount Phad is a value larger than 90 degrees and smaller than 180 degrees.

When the phase advance amount Phad is a value equal to or larger than 40 degrees and equal to or smaller than 50 degrees, and is typically 45 degrees, the damping effect can be secured in a wide frequency range between, for example, the sprung resonance frequency and the unsprung resonance frequency of the vehicle. In other words, a possibility that the damping effect in a frequency range lower than the medium frequency or in a frequency range higher than the medium frequency is sacrificed can be reduced as compared to a case where the phase advance amount Phad is smaller than 40 degrees or larger than 50 degrees.

The collection of the unsprung displacements $z_1$ and the pieces of positional information may be executed in second and third embodiments described later. The collection of the unsprung displacements $z_1$ and the pieces of positional information may be omitted. In this case, the vertical acceleration sensors 31FR and 31FL and the stroke sensors 32FR and 32FL are omitted.

In the first embodiment, the unsprung displacements $z_1$ are calculated based on detection results from the vertical acceleration sensors 31FR and 31FL and the stroke sensors 32FR and 32FL. However, the unsprung displacement $z_1$ may be calculated through second-order integral of a vertical acceleration of the unsprung portion that is detected by a vertical acceleration sensor of the unsprung portion at the position of each wheel. Further, the unsprung displacement $z_1$ may be calculated by using an observer publicly known in this technical field based on at least one of the vertical acceleration of the sprung portion, the suspension stroke, and the vertical acceleration of the unsprung portion at the position of each wheel.

Second Embodiment

Damping Control Routine of Second Embodiment

Figure 9:
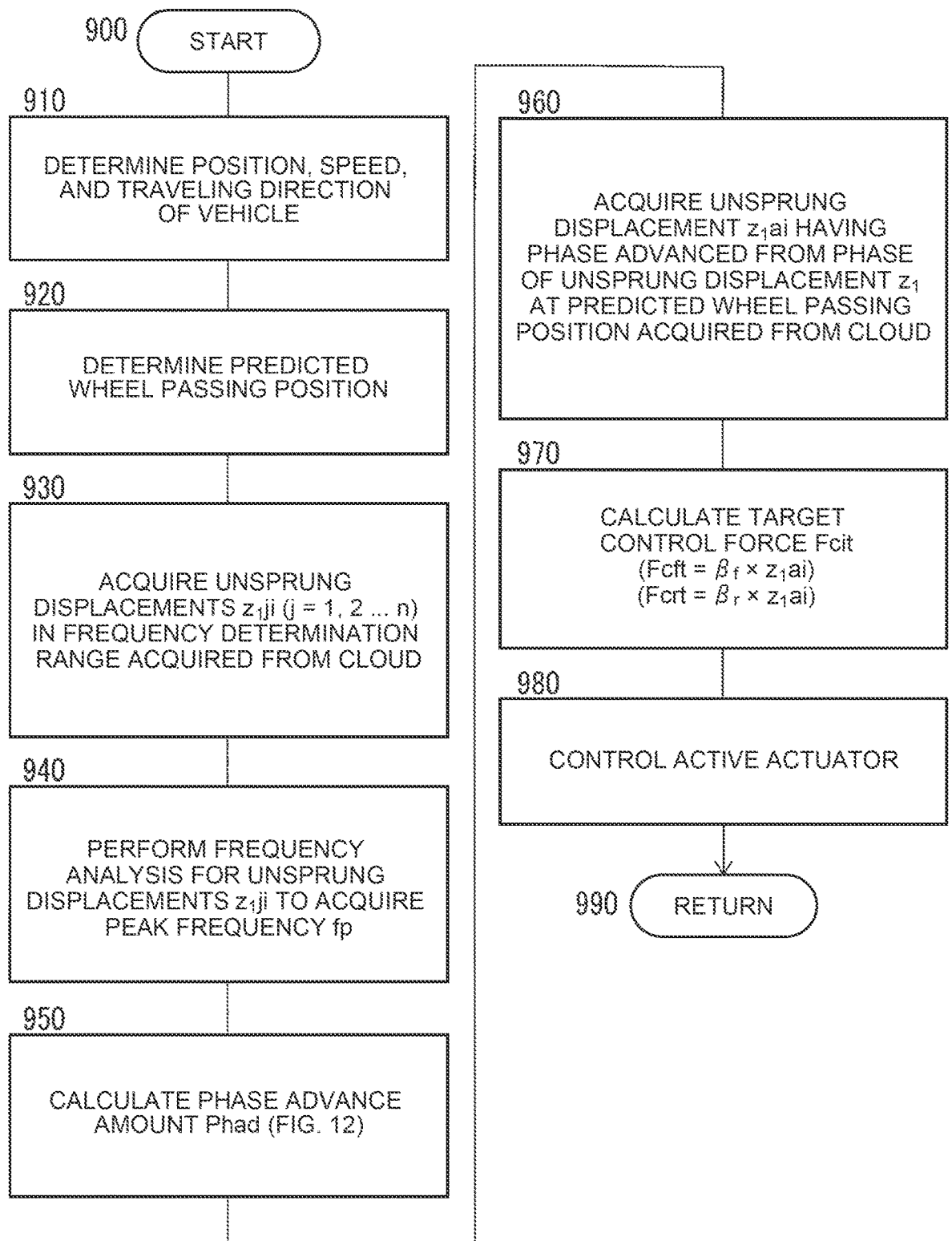
FIG. 9 is a flowchart illustrating a damping control routine for the vehicle according to a second embodiment.

In a second embodiment, the CPU of the ECU 30 executes a damping control routine illustrated in a flowchart of FIG. 9 every time a predetermined period has elapsed.

At a predetermined timing, the CPU starts a process from Step 900 of FIG. 9, executes Step 910 to Step 980, and proceeds to Step 990 to temporarily terminate this routine in order of, for example, the left front wheel, the right front wheel, the left rear wheel, and the right rear wheel. The symbol "i" in the unsprung displacement $z_1si$ or the like repeatedly changes in order of "fl", "fr", "rl", and "rr".

As understood from comparison between FIG. 9 and FIG. 7, Steps 910, 920, and 960 to 980 are executed similarly to Steps 710, 720, and 730 to 750 of the first embodiment, respectively.

Step 930: The CPU acquires unsprung displacements $z_1ji$ (j=1, 2 . . . n) at a predicted passing position of each wheel and in a frequency determination range (not illustrated) ahead of the predicted passing position from among "unsprung displacements $z_1$ in preparatory zone" described later, which are acquired in advance from the preview reference data 45 in the cloud 40.

Step 940: The CPU performs frequency analysis for the unsprung displacements $z_1ji$ to acquire a frequency corresponding to a maximum frequency component (referred to as "peak frequency fp").

Figure 12:
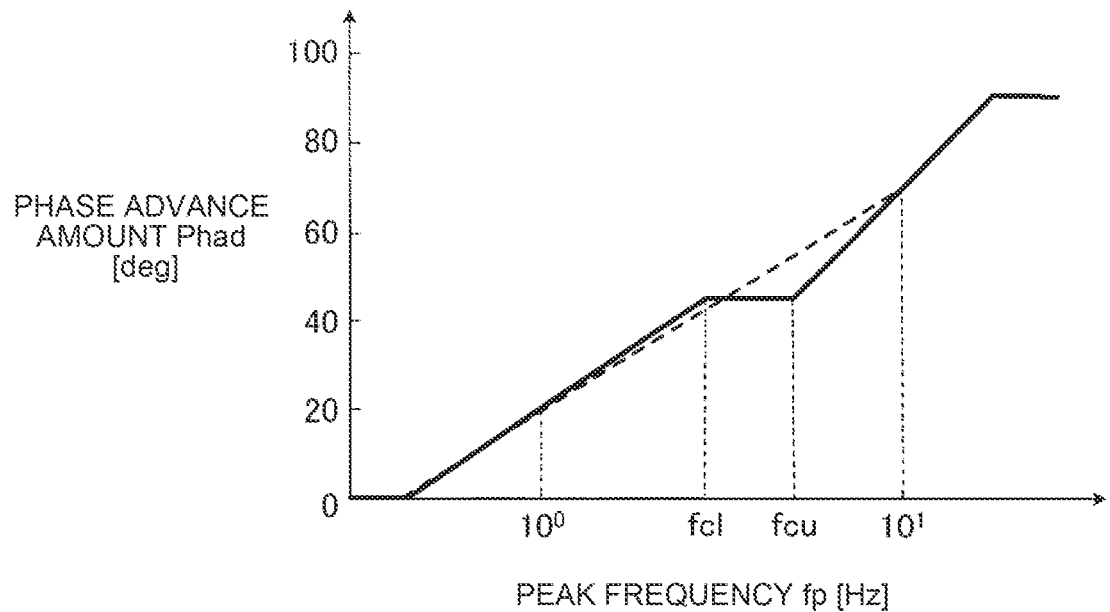
FIG. 12 is a diagram illustrating a map for calculating a phase advance amount Phad based on a peak frequency fp.

Step 950: The CPU acquires a phase advance amount Phad for advancing the phase of the transfer function from the unsprung displacement $z_1i$ to the target control force Fcit by referring to a map illustrated in FIG. 12 based on the peak frequency fp. As illustrated in FIG. 12, when the peak frequency fp is lower than a lower limit value fcl of a reference frequency range, the phase advance amount Phad is set to a value larger than 0 degrees and smaller than 45 degrees, and is set to increase as the peak frequency fp increases. When the peak frequency fp is higher than an upper limit value fcu of the reference frequency range, the phase advance amount Phad is set to a value larger than 45 degrees and smaller than 90 degrees, and is set to increase as the peak frequency fp increases. When the peak frequency fp is in the reference frequency range, the phase advance amount Phad is set to 45 degrees.

The lower limit value fcl of the reference frequency range may be, for example, 2 Hz that is a frequency higher than the sprung resonance frequency fres of the vehicle 10 (for example, 1 Hz). The upper limit value fcu of the reference frequency range may be, for example, 4 Hz that is a frequency lower than the unsprung resonance frequency freu of the vehicle 10 (for example, 10 Hz). The phase advance amount Phad may be acquired by referring to a map indicated by a dashed line in FIG. 12 based on the peak frequency fp.

As understood from the above, the ECU 30 of the damping control device 20 of the second embodiment performs frequency analysis for the unsprung displacements $z_1i$ in the frequency determination range, and increases the phase advance amount Phad for the phase advancing process as the peak frequency fp of the unsprung displacements $z_1i$ in the frequency determination range increases. Therefore, the phase advance amount Phad is variably set depending on the peak frequency fp to increase as the peak frequency increases.

In FIG. 13, the damping performance for the sprung portion at a frequency equal to or lower than the medium frequency can be made closer to the damping performance in the case A where the target control force is calculated as the value proportional to the unsprung displacement $z_1i$ in comparison with the case D where the phase advance amount is constant. Further, the damping performance for the sprung portion at a frequency equal to or higher than the medium frequency can be made closer to the damping performance in the case B where the target control force is calculated as the value proportional to the unsprung speed $dz_1i$ in comparison with the case D where the phase advance amount is constant.

Third Embodiment

Damping Control Routine of Third Embodiment

Figure 10:
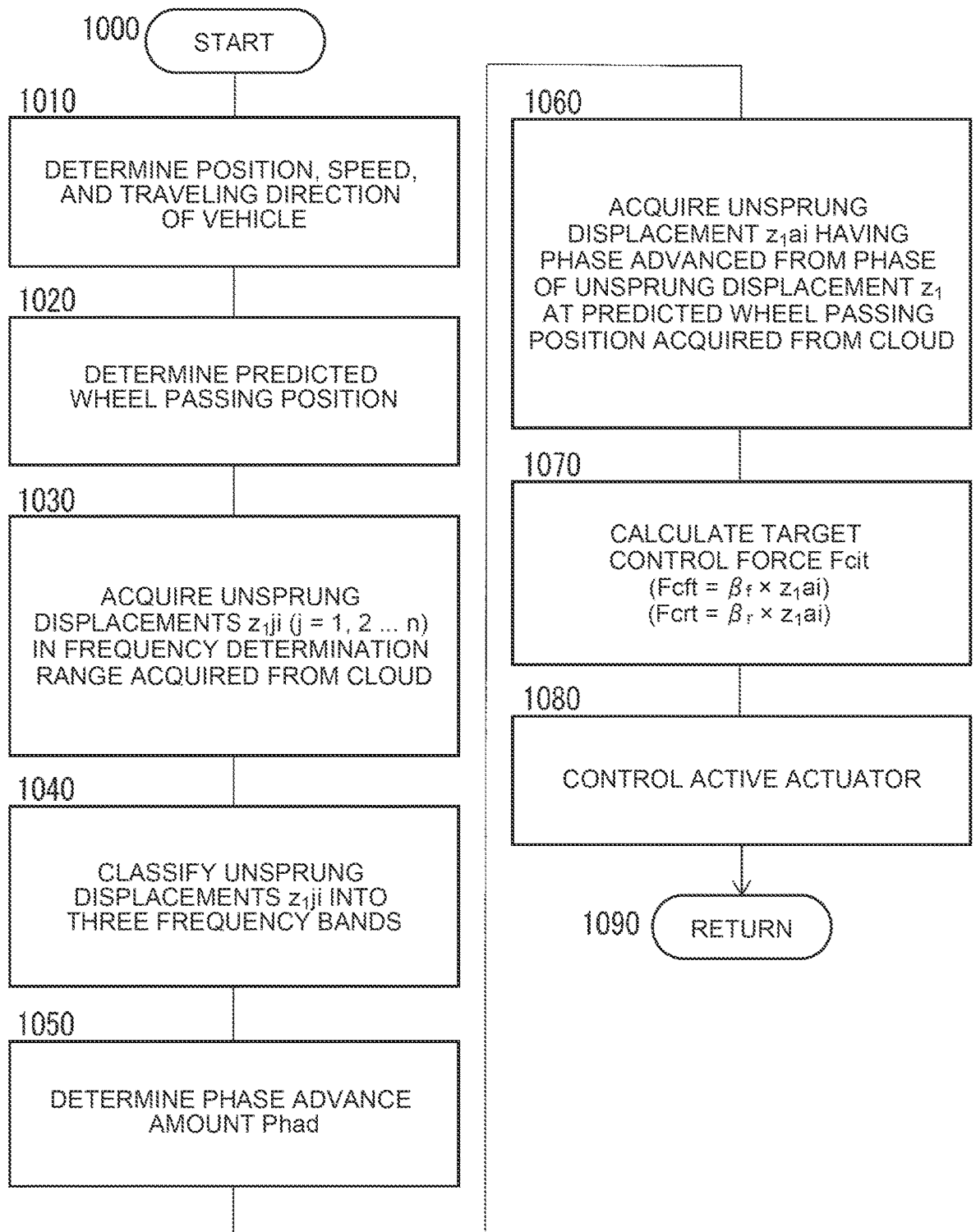
FIG. 10 is a flowchart illustrating a damping control routine for the vehicle according to a third embodiment.

In a third embodiment, the CPU of the ECU 30 executes a damping control routine illustrated in a flowchart of FIG. 10 every time a predetermined period has elapsed.

At a predetermined timing, the CPU starts a process from Step 1000 of FIG. 10, executes Step 1010 to Step 1080, and proceeds to Step 1090 to temporarily terminate this routine in order of, for example, the left front wheel, the right front wheel, the left rear wheel, and the right rear wheel. The symbol "i" in the unsprung displacement $z_1si$ or the like repeatedly changes in order of "fl", "fr", "rl", and "rr".

As understood from comparison between FIG. 10 and FIG. 9, Steps 1010 to 1030 and 1060 to 1080 are executed similarly to Steps 910 to 930 and 960 to 980 of the second embodiment, respectively.

Step 1040: The CPU performs frequency analysis for unsprung displacements $z_1ji$ acquired in Step 1030 to classify the unsprung displacements $z_1ji$ into three frequency bands, that is, a low-frequency band lower than the lower limit value fcl of the reference frequency range, a medium-frequency band in the reference frequency range, and a high-frequency band higher than the upper limit value fcu of the reference frequency range.

Step 1050: The CPU acquires, from among the three bands, a band having the largest count of unsprung displacements $z_1ji$ whose amplitudes are equal to or larger than a preset reference value (referred to as "largest-count band") as a frequency band in which the unsprung displacement is largest. When the largest-count band is the low-frequency band, the CPU sets the phase advance amount Phad for advancing the phase of the transfer function from the unsprung displacement $z_1i$ to the target control force Fcit to Phads (positive constant) larger than 0 degrees and smaller than 45 degrees. When the largest-count band is the medium-frequency band, the CPU sets the phase advance amount Phad to Phadm (value larger than 40 degrees and smaller than 50 degrees, or 45 degrees). When the largest-count band is the high-frequency band, the CPU sets the phase advance amount Phad to Phadl (positive constant) larger than 45 degrees and smaller than 90 degrees.

The frequency band in which the unsprung displacement is largest may be determined through arbitrary procedures publicly known in this technical field (revised examples of the third embodiment). For example, maximum values Pmax1 to Pmax3 of P-P values of the unsprung displacements $z_1ji$ may be determined for the three bands, and a band having the largest maximum value may be set as the frequency band in which the unsprung displacement is largest (first revised example). Further, moving averages MA1 to MA3 of the unsprung displacements $z_1ji$ subjected to low-pass filtering may be determined for the three bands, and a band having the largest moving average may be set as the frequency band in which the unsprung displacement is largest (second revised example). Still further, the unsprung displacements $z_1ji$ may be subjected to fast Fourier transform, moving averages of frequency components may be calculated as amplitude indices Vma1 to Vma3 for the three bands, and a band having the largest amplitude index may be set as the frequency band in which the unsprung displacement is largest (third revised example).

As understood from the above, according to the third embodiment, the unsprung displacements $z_1i$ in the frequency determination range are classified into the plurality of frequency bands, and the phase advance amount Phad for the phase advancing process can variably be set depending on the magnitudes of the unsprung displacements $z_1i$ in the frequency bands. Thus, the damping performance for the sprung portion can be improved as compared to the case where the phase advance amount is constant.

In the third embodiment, Phads and Phadl are positive constants. When a band having the second largest count of the unsprung displacements $z_1ji$ next to the largest-count band is the low-frequency band, Phads may be set to a value smaller than that when the band is the medium-frequency band. Similarly, when the band having the second largest count of the unsprung displacements $z_1ji$ next to the largest-count band is the medium-frequency band, Phadl may be set to a value larger than that when the band is the low-frequency band.

In the third embodiment, the unsprung displacements $z_1ji$ are classified into the three frequency bands, but the number of frequency bands may be a number other than three. Particularly when the number of frequency bands is much larger than three, the frequency band in which the unsprung displacement is largest may be determined based on any one of the third embodiment and its first to third revised examples, and the phase advance amount Phad may be acquired by referring to the map of FIG. 12 based on the frequency band.

According to the first to third embodiments, it is possible to reduce a possibility of problems such as an increase in energy consumption, a decrease in the durability of the actuator, and an increase in a heat generation amount due to an increase in the damping control force in the high-frequency range.

Modified Example

Figure 11:
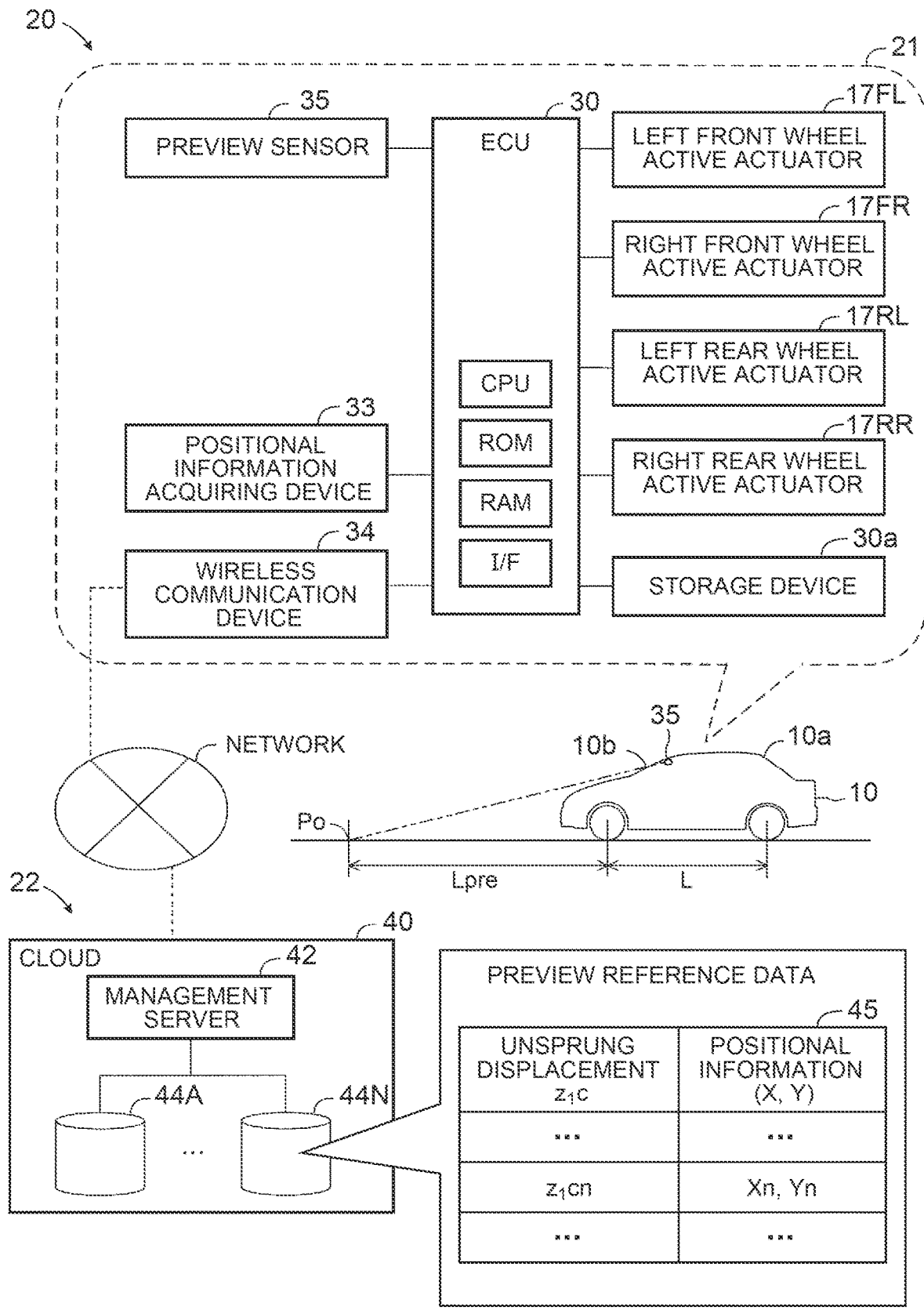
FIG. 11 is a schematic structural diagram of a damping control device according to a revised example of the present disclosure.

In the first to third embodiments, the unsprung displacement $z_1i$ is acquired from the preview reference data 45 in the cloud 40. As illustrated in FIG. 11, the unsprung displacement $z_1i$ may be acquired based on a road surface displacement $z_0$ (value indicating a vertical displacement of a road surface) ahead of the vehicle that is detected by a preview sensor 35.

The preview sensor 35 may be an arbitrary preview sensor publicly known in this technical field as long as the road surface displacement ahead of the vehicle 10 can be acquired like, for example, a camera sensor, a LIDAR sensor, and a radar. In cooperation with the on-board preview sensor 35, the ECU 30 functions as a road surface displacement related information acquiring device configured to acquire pieces of road surface displacement related information ahead of the wheels based on detection results from the preview sensor. In this embodiment, the external device 22, the positional information acquiring device 33, and the wireless communication device 34 may be omitted.

As illustrated in FIG. 11, the preview sensor 35 is attached to, for example, an upper-end inner surface of a windshield 10b of the vehicle 10 at the center in a vehicle width direction, and detects a target position Po that is a preview distance Lpre ahead of the front wheels 11F and a road surface displacement $z_0$ around the target position. The preview distance Lpre is larger than a front wheel preview distance $L_{pf}$ when the vehicle speed of the vehicle 10 is a maximum rated vehicle speed (described later). FIG. 11 illustrates one preview sensor 35, but a pair of preview sensors may be provided in association with the right and left front wheels.

Although the specific embodiments of the present disclosure are described above in detail, the present disclosure is not limited to the embodiments. It is understood for persons having ordinary skill in the art that various other embodiments may be adopted within the scope of the present disclosure.

For example, in the embodiments described above, the road surface displacement related value that is based on the road surface displacement related information is the unsprung displacement, but may be a road surface displacement that is a vertical displacement of a road surface.

In the embodiments described above, the preview reference data 45 need not be stored in the storage device 44 in the cloud 40, but may be stored in the storage device 30a.

When a traveling route of the vehicle 10 is determined in advance, the CPU may download preview reference data 45 of the traveling route in advance from the cloud 40 and store the preview reference data 45 in the storage device 30a before the vehicle 10 starts to travel along the traveling route.

In the first and second embodiments, the calculation process for the target control force Fcrt of the rear wheel 11R is not limited to that in the example described above. For example, the CPU may calculate the target control force Fcrt based on the unsprung displacement $z_1$ at the current position of the front wheel 11F at the current time tp, and transmit a control command containing the target control force Fcrt to the rear wheel active actuator 17R at a timing delayed by a period (L/V−tpr) from the current time tp. That is, the CPU may transmit the control command containing the target control force Fcrt to the rear wheel active actuator 17R at a timing when the rear wheel 11R reaches a point behind the current position of the front wheel 11F by the rear wheel preview distance $L_{pr}$.

The CPU determines, independently of the front wheel predicted movement path, a rear wheel predicted movement path based on a current position of the rear wheel 11R, a traveling direction Td of the vehicle 10, and the positional relationship data, and determines, as the rear wheel predicted passing position, a position spaced away by the rear wheel preview distance $L_{pr}$ along the rear wheel predicted movement path. The CPU acquires an unsprung displacement $z_1$ at the rear wheel predicted passing position, and calculates the target control force Fcrt of the rear wheel 11R based on an unsprung displacement $z_1a$ having a phase advanced from that of the acquired unsprung displacement $z_1$.

The vehicle speed V1 and the traveling direction Td are acquired based on the current position of the vehicle 10 that is acquired by the GNSS receiver. The present disclosure is not limited to this case. For example, the damping control device 20 may include "wheel speed sensor and steering angle sensor" (not illustrated). The wheel speed sensor may detect a rotation speed of the wheel 11, and the CPU may calculate the vehicle speed V1 based on the rotation speed of the wheel 11. A yaw rate sensor configured to detect a yaw rate of the vehicle 10 may be provided, and the CPU may acquire the traveling direction Td based on the yaw rate and the vehicle speed V1.

The suspensions 13FR to 13RL may be any type of suspension as long as the wheels 11FR to 11RL are allowed to be displaced in the vertical direction relative to the vehicle body 10a. The suspension springs 16FR to 16RL may be arbitrary springs such as compression coil springs or air springs.

In the embodiments described above, the active actuators 17FR to 17RL are provided in correspondence with the respective wheels 11, but one active actuator 17 may be provided to at least one wheel 11. For example, the vehicle 10 may have only the front wheel active actuators 17F or the rear wheel active actuators 17R.

In the embodiments and the modified example described above, the active actuator 17 is used as the control force generating device, but the control force generating device is not limited to the active actuator 17. That is, the control force generating device may be an actuator configured to adjustably generate a vertical control force for damping the sprung portion 51 based on a control command containing the target control force.

The control force generating device may be an active stabilizer device (not illustrated). The active stabilizer device includes a front wheel active stabilizer and a rear wheel active stabilizer. When the front wheel active stabilizer generates a vertical control force between the sprung portion 51 and the unsprung portion 50 corresponding to the left front wheel 11FL (left front wheel control force), the front wheel active stabilizer generates a control force in a direction opposite to the direction of the left front wheel control force between the sprung portion 51 and the unsprung portion 50 corresponding to the right front wheel 11FR (right front wheel control force). Similarly, when the rear wheel active stabilizer generates a vertical control force between the sprung portion 51 and the unsprung portion 50 corresponding to the left rear wheel 11RL (left rear wheel control force), the rear wheel active stabilizer generates a control force in a direction opposite to the direction of the left rear wheel control force between the sprung portion 51 and the unsprung portion 50 corresponding to the right rear wheel 11RR (right rear wheel control force). The structure of the active stabilizer device is well known, and is incorporated herein by reference to Japanese Unexamined Patent Application Publication No. 2009-96366 (JP 2009-96366 A). The active stabilizer device may include at least one of the front wheel active stabilizer and the rear wheel active stabilizer.

The control force generating device may be a device configured to generate vertical control forces F based on geometry of the suspensions 13FR to 13RL by increasing or reducing braking or driving forces on the wheels 11 of the vehicle 10. The structure of this device is well known, and is incorporated herein by reference to, for example, Japanese Unexamined Patent Application Publication No. 2016-107778 (JP 2016-107778 A). Using a well-known method, the ECU 30 calculates braking or driving forces for generating control forces F corresponding to target control forces Ft.

The device includes driving devices (for example, in-wheel motors) configured to apply driving forces to the wheels 11, and braking devices (brakes) configured to apply braking forces to the wheels 11. The driving device may be a motor or an engine configured to apply driving forces to the front wheels, the rear wheels, or the four wheels. The control force generating device may include at least one of the driving device and the braking device.

The control force generating device may be each of the adjustable shock absorbers 15FR to 15RL. In this case, the ECU 30 controls the damping coefficients C of the shock absorbers 15FR to 15RL to change damping forces of the shock absorbers 15FR to 15RL by values corresponding to target control forces Fct.

What is claimed is:

1. A damping control device for a vehicle, comprising:
an actuator configured to generate a vertical control force for damping a sprung portion of the vehicle between at least one wheel and a portion of a vehicle body that corresponds to a position of the wheel;
an electronic control unit configured to control the actuator; and
a road surface displacement related information acquiring device configured to acquire road surface displacement related information related to a vertical displacement of a road surface ahead of the wheel, wherein:
the electronic control unit is configured to:
determine a predicted wheel passing position where the wheel is predicted to pass,
calculate a target control force for reducing vibration of the sprung portion when the wheel passes through the predicted wheel passing position as a value proportional to a road surface displacement related value that is based on the road surface displacement related information, and control the actuator such that the control force generated by the actuator becomes the target control force when the wheel passes through the predicted wheel passing position;

the electronic control unit is configured to calculate the target control force by using the road surface displacement related value having a phase that has been advanced to advance a phase of a transfer function from the road surface displacement related value based on the road surface displacement related information to the target control force by a phase advance amount larger than 0 degrees;

the electronic control unit is configured to acquire the road surface displacement related values at the predicted wheel passing position and in a frequency determination range ahead of the predicted wheel passing position based on the road surface displacement related information; and the electronic control unit is configured to increase the phase advance amount as a major frequency of the road surface displacement related values in the frequency determination range increases.

2. The damping control device for the vehicle according to claim 1, wherein the electronic control unit is configured to calculate the target control force by using the road surface displacement related value having the advanced phase to set the phase advance amount to a value larger than 0 degrees and smaller than 180 degrees for a predetermined frequency.

3. The damping control device for the vehicle according to claim 2, wherein the phase advance amount is a value larger than 0 degrees and smaller than 90 degrees.

4. The damping control device for the vehicle according to claim 3, wherein the phase advance amount is a value equal to or larger than 40 degrees and equal to or smaller than 50 degrees.

5. The damping control device for the vehicle according to claim 1, wherein the electronic control unit is configured to set the phase advance amount to a value equal to or larger than 40 degrees and equal to or smaller than 50 degrees when the major frequency of the road surface displacement related values in the frequency determination range is in a reference frequency range preset between a sprung resonance frequency and an unsprung resonance frequency of the vehicle.

6. The damping control device for the vehicle according to claim 1, wherein the electronic control unit is configured to set the phase advance amount to a value larger than 0 degrees and smaller than 45 degrees when the major frequency of the road surface displacement related values in the frequency determination range is lower than a lower limit frequency of a reference frequency range preset between a sprung resonance frequency and an unsprung resonance frequency of the vehicle.

7. The damping control device for the vehicle according to claim 1, wherein the electronic control unit is configured to set the phase advance amount to a value larger than 45 degrees and smaller than 90 degrees when the major frequency of the road surface displacement related values in the frequency determination range is higher than an upper limit frequency of a reference frequency range preset between a sprung resonance frequency and an unsprung resonance frequency of the vehicle.

8. The damping control device for the vehicle according to claim 1, wherein the electronic control unit is configured to:

acquire the road surface displacement related values at the predicted wheel passing position and in a frequency determination range ahead of the predicted wheel passing position based on the road surface displacement related information;

classify the road surface displacement related values in the frequency determination range into a plurality of frequency bands; and determine the phase advance amount based on magnitudes of the road surface displacement related values in the frequency bands.

9. A damping control method for a vehicle for damping a sprung portion of the vehicle by controlling an actuator configured to generate a vertical control force for damping the sprung portion between at least one wheel and a portion of a vehicle body that corresponds to a position of the wheel, the damping control method comprising:

determining a predicted wheel passing position where the wheel is predicted to pass;

acquiring road surface displacement related information related to a vertical displacement of a road surface ahead of the wheel;

calculating a target control force for reducing vibration of the sprung portion when the wheel passes through the predicted wheel passing position as a value proportional to a road surface displacement related value having a phase that has been advanced to advance a phase of a transfer function from the road surface displacement related value based on the road surface displacement related information to the target control force by a phase advance amount larger than 0 degrees;

controlling the actuator such that the control force generated by the actuator becomes the target control force when the wheel passes through the predicted wheel passing position;

acquiring the road surface displacement related values at the predicted wheel passing position and in a frequency determination range ahead of the predicted wheel passing position based on the road surface displacement related information; and increasing the phase advance amount as a major frequency of the road surface displacement related values in the frequency determination range increases.

10. The damping control method according to claim 9, further comprising setting the phase advance amount to a value equal to or larger than 40 degrees and equal to or smaller than 50 degrees when the major frequency of the road surface displacement related values in the frequency determination range is in a reference frequency range preset between a sprung resonance frequency and an unsprung resonance frequency of the vehicle.

11. The damping control method according to claim 9, further comprising setting the phase advance amount to a value larger than 0 degrees and smaller than 45 degrees when the major frequency of the road surface displacement related values in the frequency determination range is lower than a lower limit frequency of a reference frequency range preset between a sprung resonance frequency and an unsprung resonance frequency of the vehicle.

12. The damping control method according to claim 9, further comprising setting the phase advance amount to a value larger than 45 degrees and smaller than 90 degrees when the major frequency of the road surface displacement related values in the frequency determination range is higher than an upper limit frequency of a reference frequency range preset between a sprung resonance frequency and an unsprung resonance frequency of the vehicle.

13. A damping control device for a vehicle, comprising:
an actuator configured to generate a vertical control force for damping a sprung portion of the vehicle between at least one wheel and a portion of a vehicle body that corresponds to a position of the wheel;
an electronic control unit configured to control the actuator; and
a road surface displacement related information acquiring device configured to acquire road surface displacement related information related to a vertical displacement of a road surface ahead of the wheel, wherein:
the electronic control unit is configured to:
  determine a predicted wheel passing position where the wheel is predicted to pass,
  calculate a target control force for reducing vibration of the sprung portion when the wheel passes through the predicted wheel passing position as a value proportional to a road surface displacement related value that is based on the road surface displacement related information, and
  control the actuator such that the control force generated by the actuator becomes the target control force when the wheel passes through the predicted wheel passing position;
the electronic control unit is configured to calculate the target control force by using the road surface displacement related value having a phase that has been advanced to advance a phase of a transfer function from the road surface displacement related value based on the road surface displacement related information to the target control force by a phase advance amount larger than 0 degrees;
the electronic control unit is configured to acquire the road surface displacement related values at the predicted wheel passing position and in a frequency determination range ahead of the predicted wheel passing position based on the road surface displacement related information;
the electronic control unit is configured to classify the road surface displacement related values in the frequency determination range into a plurality of frequency bands; and
the electronic control unit is configured to determine the phase advance amount based on magnitudes of the road surface displacement related values in the frequency bands.

* * * * *